United States Patent
Dhanda et al.

(10) Patent No.: US 10,447,657 B2
(45) Date of Patent: Oct. 15, 2019

(54) METHOD AND APPARATUS FOR TRANSMITTING AND RECEIVING SECURE AND NON-SECURE DATA

(75) Inventors: Mungal Singh Dhanda, Slough (GB); Simon Walke, Farnborough (GB)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 12/993,825

(22) PCT Filed: Mar. 17, 2009

(86) PCT No.: PCT/US2009/037451
§ 371 (c)(1),
(2), (4) Date: Feb. 8, 2011

(87) PCT Pub. No.: WO2010/021764
PCT Pub. Date: Feb. 25, 2010

(65) Prior Publication Data
US 2011/0126021 A1    May 26, 2011

Related U.S. Application Data

(60) Provisional application No. 61/091,292, filed on Aug. 22, 2008.

(51) Int. Cl.
*H04L 9/32* (2006.01)
*H04L 29/06* (2006.01)
(Continued)

(52) U.S. Cl.
CPC ........ *H04L 63/0428* (2013.01); *G06F 21/606* (2013.01); *H04L 9/32* (2013.01);
(Continued)

(58) Field of Classification Search
CPC ............................ H04L 63/0428; G06F 21/606
(Continued)

(56) References Cited

U.S. PATENT DOCUMENTS 4,907,275 A * 3/1990 Hashimoto ........... H04L 9/0637
380/29
4,949,242 A * 8/1990 Takeuchi ................. G11C 8/04
711/219
(Continued)

FOREIGN PATENT DOCUMENTS

EP   1696632 A1   8/2006
GB   2453461 A * 8/2009   ............... H04B 7/26
(Continued)

OTHER PUBLICATIONS

3GPP TS 33.102 version 7.1.0 Release 7, Universal Mobile Telecommunications System 3G Security Architecture.*
(Continued)

*Primary Examiner* — Mahfuzur Rahman
*Assistant Examiner* — Richard W Cruz-Franqui
(74) *Attorney, Agent, or Firm* — Arent Fox LLP

(57) ABSTRACT

A communications system, and a method suitable for use therein, are described which are suitable for transmitting and receiving both secure and non-secure data. The system comprises: means for transmitting data comprising both ciphered secure data and unciphered non-secure data; means for receiving transmitted data; means for deciphering the received data to produce deciphered data; and means for: validating the deciphered data to produce a first validation result and outputting the deciphered data depending upon the first validation result; or validating the received data to produce a second validation result and outputting the received data depending upon the second validation result; or validating the deciphered data to produce a first validation result and outputting the deciphered data depending upon the first validation result, and also validating the received data to produce a second validation result and outputting the received data depending upon the second validation result.

17 Claims, 19 Drawing Sheets

(51) Int. Cl.
*G06F 21/60* (2013.01)
*H04W 12/02* (2009.01)
*H04W 12/10* (2009.01)
*H04W 12/00* (2009.01)
*G06F 21/10* (2013.01)
*H04W 88/00* (2009.01)

(52) U.S. Cl.
CPC ......... *H04L 63/12* (2013.01); *H04W 12/0017* (2019.01); *H04W 12/02* (2013.01); *H04W 12/10* (2013.01); *G06F 21/10* (2013.01); *H04L 2209/34* (2013.01); *H04L 2209/80* (2013.01); *H04W 88/00* (2013.01)

(58) Field of Classification Search
USPC ........................................................ 713/176
See application file for complete search history.

(56) References Cited

U.S. PATENT DOCUMENTS

| | | | | |
|---|---|---|---|---|
| 5,386,471 | A | * | 1/1995 | Bianco .................. H04L 9/0625 713/153 |
| 5,396,543 | A | * | 3/1995 | Beeson et al. ................ 455/560 |
| 5,537,100 | A | * | 7/1996 | Hallberg ............ H04W 88/026 340/7.38 |
| 5,958,053 | A | | 9/1999 | Denker .............................. 726/1 |
| 6,044,468 | A | * | 3/2000 | Osmond ............. H04L 41/0213 380/281 |
| 6,438,627 | B1 | * | 8/2002 | Hausauer et al. ............. 710/35 |
| 6,658,476 | B1 | * | 12/2003 | Van ................................ 709/230 |
| 6,973,187 | B2 | * | 12/2005 | Gligor ................ H04L 9/0637 380/28 |
| 7,039,938 | B2 | * | 5/2006 | Candelore .......... H04N 21/2347 380/211 |
| 7,058,132 | B1 | * | 6/2006 | Sebire et al. .................. 375/259 |
| 7,058,968 | B2 | * | 6/2006 | Rowland et al. .................. 726/1 |
| 7,289,964 | B1 | * | 10/2007 | Bowman-Amuah ...................... G06F 9/5038 705/1.1 |
| 7,464,238 | B1 | * | 12/2008 | Yadav ................. G06F 11/1456 711/114 |
| 7,885,405 | B1 | * | 2/2011 | Bong .................... H04L 9/0637 380/28 |
| 7,907,734 | B2 | * | 3/2011 | Nishida ................ H04L 9/0833 380/277 |
| 2003/0202563 | A1 | * | 10/2003 | Das ........................ H04B 1/707 375/146 |
| 2003/0233461 | A1 | * | 12/2003 | Mariblanca-Nieves et al. ............ 709/228 |
| 2004/0017913 | A1 | * | 1/2004 | Hawkes ................ H04L 9/0637 380/37 |
| 2004/0019785 | A1 | * | 1/2004 | Hawkes ................ H04L 9/0637 713/168 |
| 2004/0039908 | A1 | * | 2/2004 | Rose .................... H04L 9/0637 713/168 |
| 2004/0147267 | A1 | * | 7/2004 | Hill ....................... H04W 64/00 455/441 |
| 2004/0167969 | A1 | * | 8/2004 | Tamai ................... H04L 51/066 709/207 |
| 2005/0038756 | A1 | * | 2/2005 | Nagel .................. G06K 19/086 705/76 |
| 2005/0193205 | A1 | * | 9/2005 | Jacobs ..................... G06F 21/10 713/176 |
| 2005/0198490 | A1 | * | 9/2005 | Jaganathan et al. .......... 713/151 |
| 2005/0261017 | A1 | * | 11/2005 | Vaittinen ............. H04W 52/146 455/522 |
| 2006/0106802 | A1 | * | 5/2006 | Giblin .................. G06F 21/602 |
| 2006/0117132 | A1 | * | 6/2006 | Gray et al. .................... 711/100 |
| 2006/0153375 | A1 | * | 7/2006 | Yi ....................... H04L 63/0428 380/44 |
| 2007/0101123 | A1 | * | 5/2007 | Kollmyer .......... H04L 29/06027 713/154 |
| 2007/0177879 | A1 | * | 8/2007 | Hsieh ..................... H04B 10/40 398/151 |
| 2007/0297611 | A1 | * | 12/2007 | Yun ....................... H04L 63/061 380/270 |
| 2008/0162773 | A1 | * | 7/2008 | Clegg et al. ................... 710/316 |
| 2009/0024845 | A1 | * | 1/2009 | Benshetler et al. .......... 713/156 |
| 2009/0052674 | A1 | * | 2/2009 | Nishida ................ H04L 9/0833 380/278 |
| 2009/0070484 | A1 | * | 3/2009 | Ewert et al. .................... 709/236 |
| 2009/0164781 | A1 | * | 6/2009 | Bouchard ..................... 713/165 |
| 2009/0181643 | A1 | * | 7/2009 | Thakare .................. H04L 63/08 455/411 |
| 2009/0313464 | A1 | * | 12/2009 | Shukla et al. ................. 713/151 |
| 2011/0126021 | A1 | * | 5/2011 | Dhanda ................. G06F 21/606 713/176 |
| 2012/0093314 | A1 | * | 4/2012 | Jokinen ............... H04L 63/0457 380/270 |
| 2014/0006772 | A1 | * | 1/2014 | Qureshi .................. G06F 21/10 713/150 |
| 2015/0235053 | A1 | * | 8/2015 | Lee ......................... G06F 21/72 713/193 |

FOREIGN PATENT DOCUMENTS

| | | |
|---|---|---|
| TW | 575816 B | 2/2004 |
| TW | 589820 B | 6/2004 |
| TW | I225355 B | 12/2004 |
| WO | 02069638 A1 | 9/2002 |
| WO | WO-2010021764 A1 | 2/2010 |

OTHER PUBLICATIONS

3rd GPP Technical Specification Group Radio Access Network—High Speed Downlink Packet Access, Dec. 2004 (3GPP-TS-25.308).*
3rd GPP Technical Specification Group Radio Access Network—High Speed Downlink Packet Access, Dec. 2004 (3GPP-TS-25.308) (Year: 2004).*
NPL Search (Google Scholar) (Year: 2019).*
International Search Report and Written Opinion—PCT/US2009/037451, International Search Authority—European Patent Office—dated Nov. 12, 2009.
"Universal Mobile Telecommunications System (UMTS); 3G security; Security architecture (3GPP TS 33.102 version 7.1.0 Release 7); ETSI TS 133 102" ETSI Standards, LIS, Sophia Antipolis Cedex, France, vol. 3-SA3, No. V7.1.0, Dec. 1, 2006 (Dec. 1, 2006), XP014040243.
Taiwan Search Report—TW098108788—TIPO—dated Jun. 6, 2012.
3GPP TS 24.008 V4.17.0 Technical Specification 3rd Generation Partnership Project; Technical Specification Group Core Network and Terminals; Mobile radio interface Layer 3 specification; Core network protocols; Stage 3 (Release 4) sections 4.3.2, 4.3.2b, and 10.5.1.7 (Oct. 2007) (ETSI TS 124 008 V 4.17.0).
3GPP TS 42.009 V4.1.0 Technical Specification 3rd Generation Partnership Project; Technical Specification Group Services and System Aspects; Security aspects (Release 4) section 3.5.3 (Jun. 2006) (ETSI TS 142 009 V 4.1.0).
3GPP TS 43.020 V 8.0.0 Digital Cellular Telecommunications System (Phase2+); Security-related network functions; sections 4.2 to 4.9 Release 8 (Feb. 2009) ETSI TS 143 020 V 8.0.0).

* cited by examiner

METHOD AND APPARATUS FOR TRANSMITTING AND RECEIVING SECURE AND NON-SECURE DATA

BACKGROUND

The invention relates to a method and apparatus for transmitting and receiving secure and non-secure data. The secure data is ciphered to produce ciphered secure data for transmission.

In communications systems requiring privacy of data for a user of the system, signals are encrypted prior to being transmitted and are received and de-encrypted by the user's equipment. For example, internet data such as streaming video or voice is encrypted to prevent an unauthorized user of the internet gaining access to the data. In a cellular wireless communications system, voice signals are encrypted using ciphers in order to provide users with privacy. Encryption techniques are well known and are defined in various wireless cellular system standards. Nevertheless, for the sake of a fuller understanding a brief explanation of ciphering will now be given.

The use of ciphering or encryption is well established in many types of communications systems. Ciphering is used to encrypt information for the purpose of providing better security or confidentiality of the information. Ciphering is also for preventing unauthorised access to the information by anyone other than an intended recipient.

Information is usually ciphered by means of a ciphering code prior to being transmitted as data in a signal. Associated with a ciphering code is a ciphering key. Ciphered information can only be obtained from the transmitted signal by use of a corresponding deciphering code and an associated deciphering key. In some systems the ciphering key is the same as the deciphering key. Ciphering is used in all manner of applications where security of information is desired, for example communication over the internet.

A ciphering algorithm reorders or changes data such that it cannot be read or interpreted by ordinary means but can only be read or interpreted by using the deciphering key. Only the transmitter and receiver know which ciphering key and deciphering key have been selected for the transmitter and receiver to use respectively. In one example the ciphered data is obtained by the bit-by-bit binary addition of the user data and a ciphering code or bit stream, generated by an algorithm using the ciphering key.

While ciphering algorithms offer a degree of security, it is nevertheless possible to break a cipher. This is usually done by training, or repeatedly adapting, an algorithm to make iterative or repeated attempts to determine the deciphering key, each time varying the code according to the result of the previous attempt so as to obtain a better result. This is done until the result converges on the correct deciphering key. While breaking ciphers is computationally intensive, the availability of cheap computing power in recent years has meant that the ability to breaking such ciphers is now within the reach of many people. This poses a significant security risk to individuals and organisations that require sending or receiving secure data.

The computational requirement for breaking a cipher is dependent, in part, upon the nature of the unciphered information as it exists prior to being ciphered. The computational requirement is particularly dependent upon the apparent randomness of the unciphered information. For example, if the information comprises a well-defined sequence of digital data which is ciphered and then sent repeatedly many times in the same signal, the computational requirement is much less than it would be if the sequence had been random or pseudo-random in nature. This is particularly true if the means for determining the cipher includes prior knowledge of the repeated sequence.

In cellular wireless systems when ciphering is used to encrypt data for a user, both system control data and voice data for the user are ciphered. Messages containing system control data are predefined within the system and thus are of a known form and occur at known times. There is no confidential, private or secure information contained in the control data. The information in the control data is only of use to the system itself and not to the user. But the information in the voice signals is personal and therefore users can reasonably expect a degree of privacy in their telephone conversations.

The predictable nature of the control data provides unauthorized users or hackers with a known pattern for data within the ciphered data, and the known pattern gives the hackers a reference from which they can determine the cipher used and hence work back to decipher other parts of the data including private data. Hackers can thereby determine the information they need in order to eavesdrop or hack into a private conversation for example. Information to be ciphered and sent in a signal should ideally contain minimal repeated information and, more specifically, the signal should contain minimal repeated information that is known or predictable. This is because the repeated information may be used by an intruder to train an algorithm for unauthorized determination of the ciphering key. The number of iterations required to determine the key is much reduced if the transmitted information contains repeated information. System messages are transmitted for many users of the system, and have a fixed known sequence of bits.

It can be seen from the above that prior art systems which send ciphered data containing predictable or known information are much more vulnerable to access from unauthorized third parties.

SUMMARY OF THE INVENTION

The claimed invention is defined by the appended claims comprising: the system as claim in claim 1 and its dependent claims; the receiving apparatus as claimed in claim 10 and its dependent claims; the method as claimed in claim 12 and its dependent claims; the method as claimed in claim 14 and its dependent claims; and the computer program product as claimed in claim 16 and its dependent claims.

The further features of the invention are set forthwith particularity in the appended claims and together with advantages thereof will become clearer from consideration of the following detailed description of embodiments of the invention which are given by way of example with reference to the accompanying drawings.

DETAILED DESCRIPTION OF EMBODIMENTS OF THE INVENTION

Figure 1:
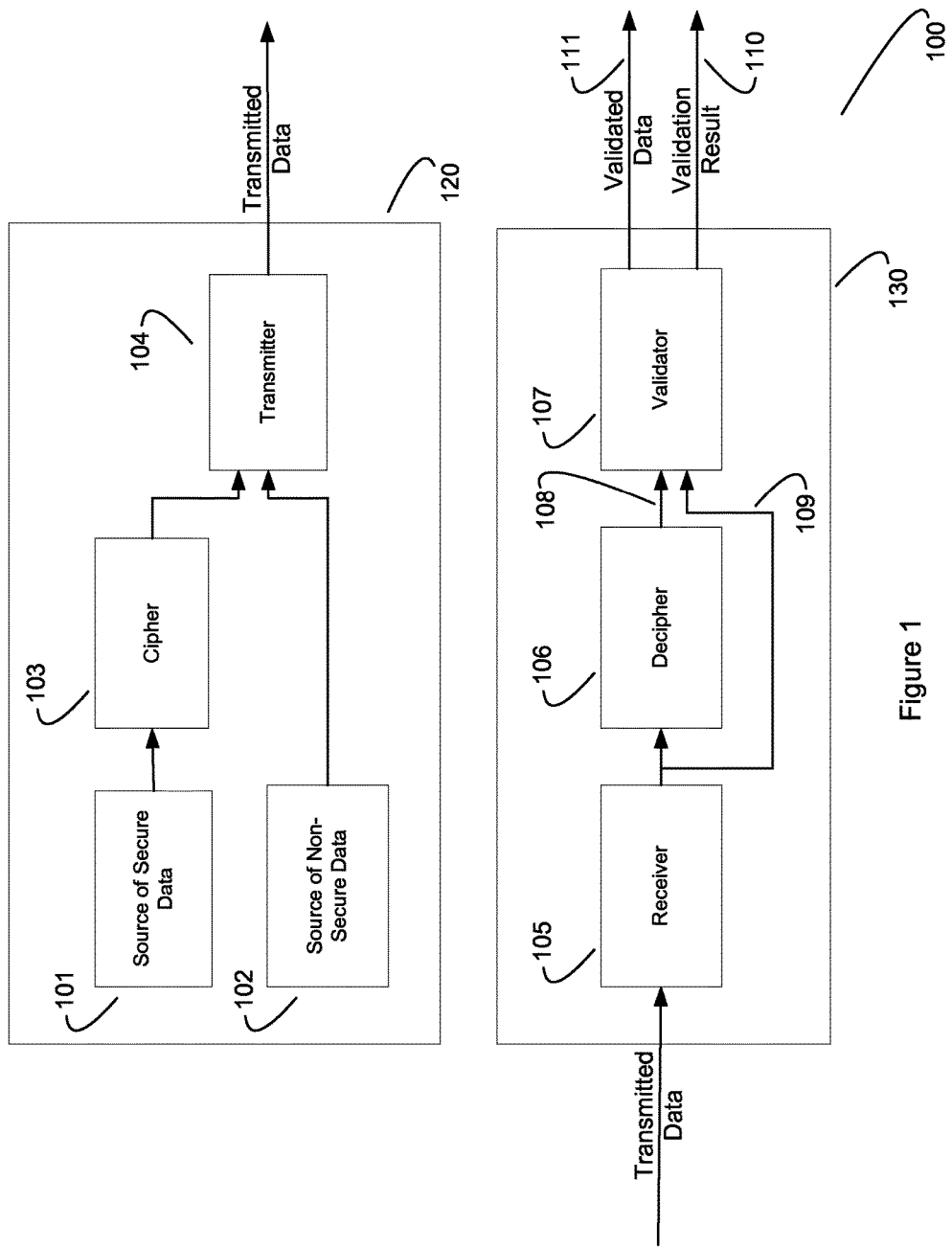
FIG. 1 is a schematic diagram of a communications system for transmitting and receiving secure and non-secure data.

FIG. 1 is a schematic diagram of a communications system for transmitting and receiving secure and non-secure data. The communications system 100 comprises a transmitting apparatus 120 and a receiving apparatus 130. The transmitting apparatus 120 comprises a source of secure data 101, a cipher 103 coupled thereto, a first transmitter 104 coupled to the cipher 103 and to the source of secure data 102. The cipher 103 operates to cipher the secure data to produce ciphered secure data and to output the ciphered secure data to the transmitter 104. The source of non-secure data 101 outputs non-secure data to the first transmitter 104. The first transmitter 104 transmits both the ciphered secure data and the non-secure data. Hereinafter, where the term 'mixed mode data' is used in the description, it will mean data comprising both ciphered data and unciphered data.

The receiving apparatus 130 comprises a first receiver 105, a decipher 106 coupled to the first receiver 105, and a validator 107 coupled to the decipher 106 and to the first receiver 105. The first receiver 105 receives data transmitted by the first transmitter 104 and outputs the received data to the decipher 106 and/or the validator. The decipher 106 deciphers the received data to produce deciphered data 108, and outputs the deciphered data 108 to the validator 107.

Thus the receiving apparatus 130 is capable of receiving, deciphering and validating the transmitted data. However, the receiving apparatus is also capable of validating the received data without deciphering it, thereby allowing unciphered data to be handled along with ciphered data. The validator is operable in three modes. The first mode is for handling ciphered data. The second mode is for handling unciphered data, and the third mode is for handling data comprising both ciphered and unciphered data.

The receiving apparatus 130 is operable, in the first mode of operation, to decipher the received data then validate the deciphered data to produce a first validation result and to output the deciphered data depending upon the first validation result. The receiving apparatus 130 is operable, in the second mode of operation, to validate the received data to produce a second validation result and to output the received data depending upon the second validation result. The receiving apparatus 130 is operable, in the third mode of operation, to decipher the received data 109 to produce deciphered data 108 then validate the deciphered data 108 to produce a first validation result 110 and output the deciphered data 108 as validated data 111 depending upon the first validation result, and also to validate the received data 109 to produce a second validation result and output the received data depending upon the second validation result. Thus the third mode comprises both the first and second modes. Apparatus and methods for using the above features will now be described in detail.

Figure 2:
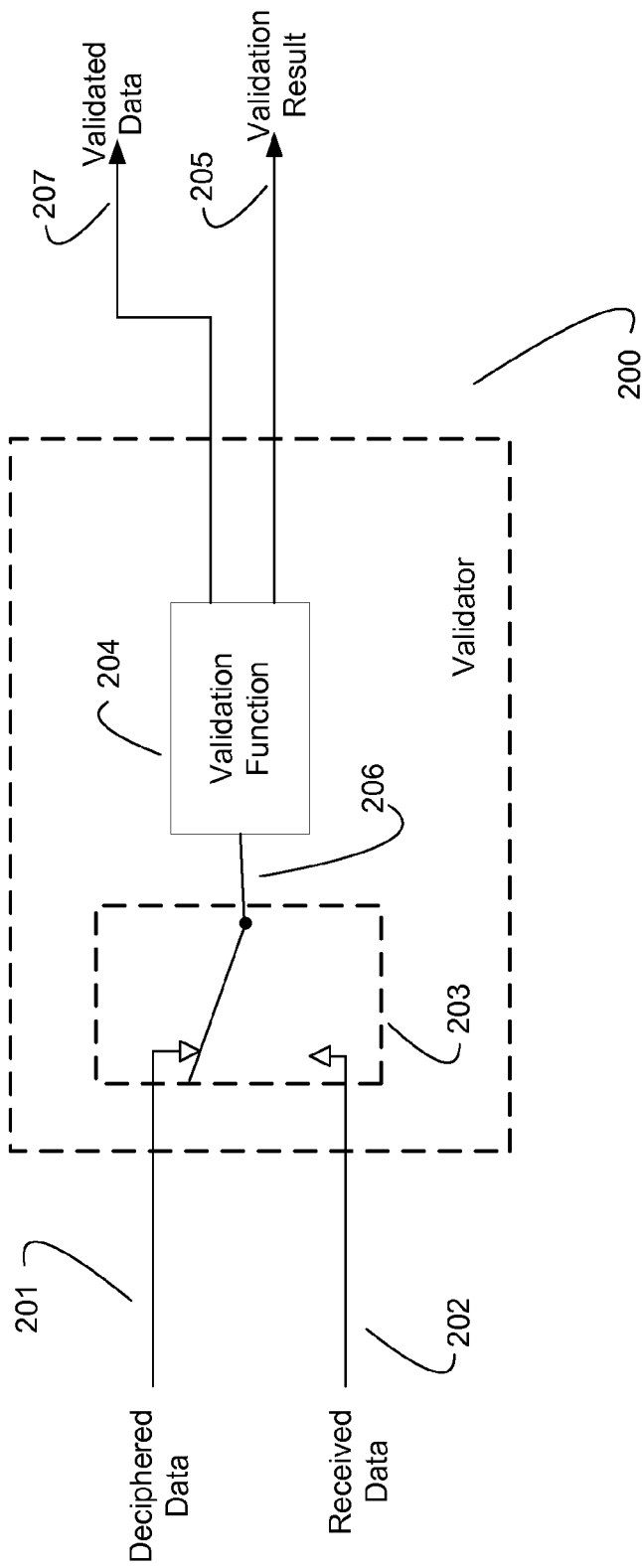
FIG. 2 is a schematic diagram of a validator for the system of FIG. 1 for validating data in series.

FIG. 2 is a schematic diagram of a validator for the system of FIG. 1 for validating data in series. Deciphered data 201 and received data 202 are input to a switch 203. The switch operates according to the first mode described above to connect the deciphered data 201 as input data 206 to a validation function 204. The switch also operates according to the second mode described above to connect the received data 202 as input data 206 to the validation function 204. The validation function 204 is operable to validate its input data 206 to determine if the input data is valid. For example if the input data contains more than a specified percentage of errors, the validator makes a determination that the input data is invalid and produces a validation result 205 which indicates the data is invalid. If the determination is that the input data is valid the validator produces a validation result 205 which indicates the data is valid. The validator also outputs the validated input data as validated data 207. Optionally, the input data 206, if it has been validated, may be used directly as validated data 207. The validator may be part of a decoder which decodes either the deciphered data 201 or the received data 202.

In the first mode, with the switch being in the position for connecting the deciphered data as shown in FIG. 2, the validation function serves to validate the deciphered data 201 and to produce a first validation result 205. In the second mode not as shown in FIG. 2, with the switch being in the position for connecting the received data, the validation function serves to validate the received data and to produce a second validation result. In the third mode, the validator operates in both the first and second modes. It can be seen that, as shown in FIG. 2, the validator operates according either the first or second mode at any instant.

Figure 3:
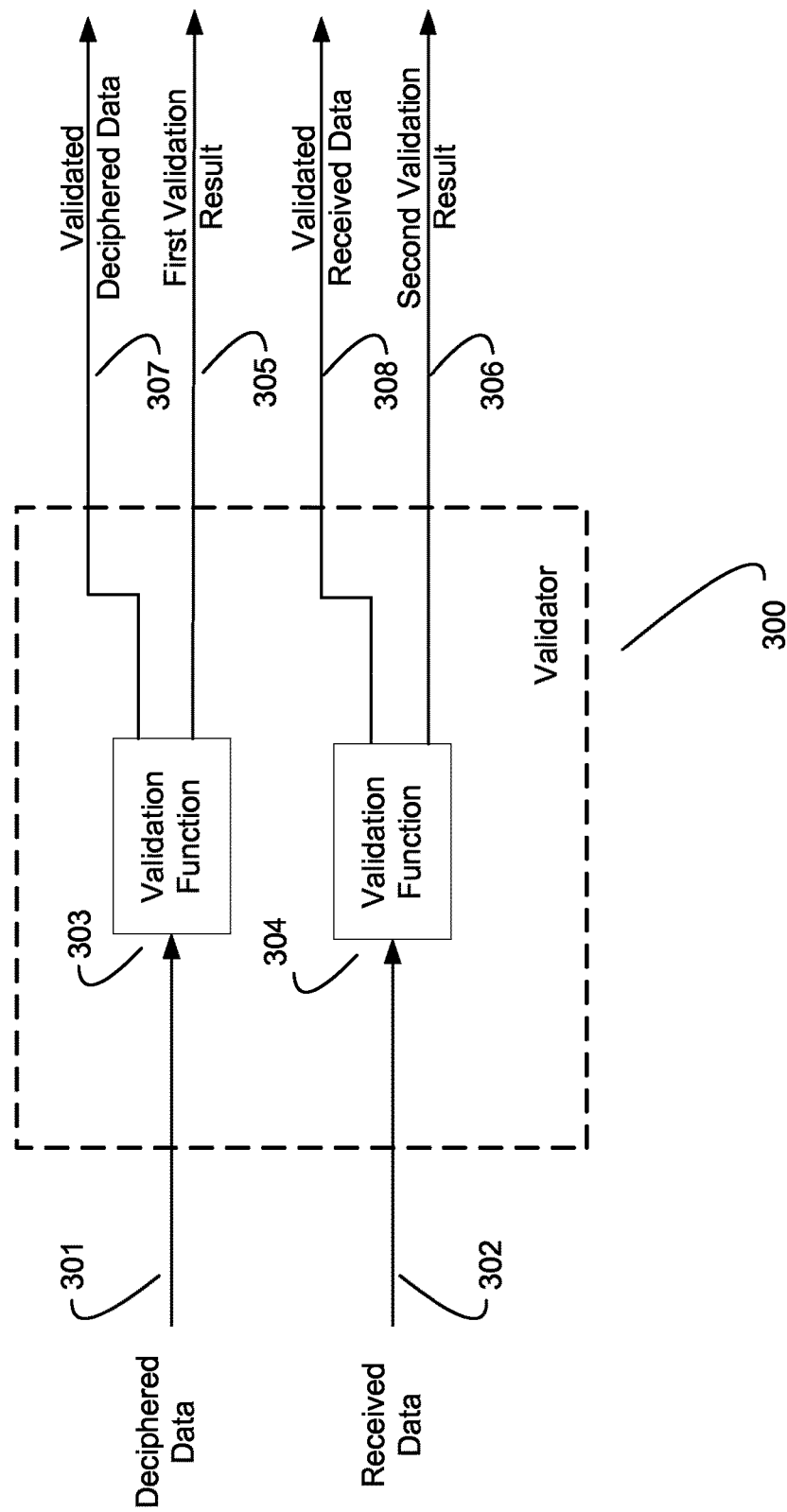
FIG. 3 is a schematic diagram of a validator for the system of FIG. 1 for validating data in parallel.

FIG. 3 is a schematic diagram of a validator for the system of FIG. 1 for validating data in parallel. Deciphered data 301 and received data 302 are input in parallel to validation function 303 and validation function 304 respectively. Validation function 303 and validation function 304 could each be considered as being part of a single validation function. Validation function 303 operates to validate the deciphered data 301 to produce a first validation result 305 and validated deciphered data, and validation function 304 operates to validate the received data 302 to produce a second validation result 306 and validated received data 308.

Figure 4:
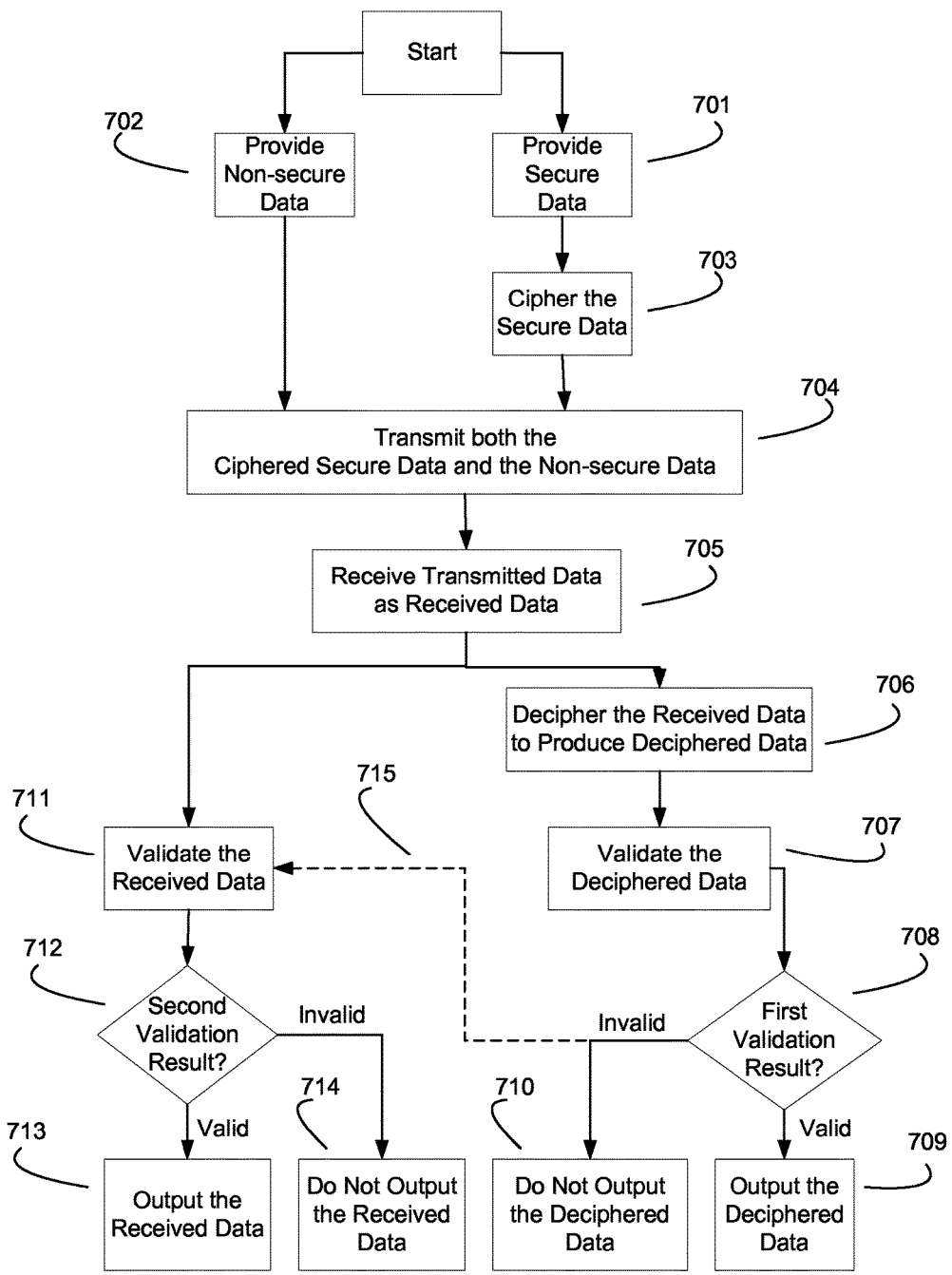
FIG. 4 is a flow diagram illustrating a method of transmitting and receiving secure and non-secure data.

FIG. 4 is a flow diagram illustrating a method of transmitting and receiving secure and non-secure data, for example in the apparatus of FIG. 1. In block 701 secure data is provided and in block 702 non-secure data is provided. In block 703 the secure data is ciphered to produce ciphered secure data. In block 704 both the ciphered secure data and the non-secure data are transmitted.

In block 705 transmitted data is received as received data. In block 706 the received data is deciphered to produce deciphered data. In block 707 the deciphered data is validated to produce a first validation result. The validation result indicates whether the data is valid or invalid. In block 708 two different outcomes are provided depending on whether the deciphered data is valid or invalid. If the deciphered data is valid the deciphered data is output in block 709. If however the deciphered data is invalid the deciphered data is not output as represented by block 710.

In block 711 the received data is validated to produce a second validation result. The received data is output, or not output, depending upon the second validation result, as shown by blocks 712, 713 and 714. In one example, as indicated by the dashed line 715, the received data is only validated in block 711 provided that the first validation result has been obtained, the validation result indicating that the deciphered data is invalid. Therefore in this example the validation of the deciphered data and the validation of the received data are performed in series, one after the other. One convenience of series processing is that the second validation 711 need not be performed if the first validation (block 707) results in valid data (blocks 708, 709). The apparatus shown in FIG. 2 may be used for series processing, for example. In another example, the received data and the deciphered data are validated in parallel, as indicated by the removal of the dashed line 715. One convenience of parallel processing is that it may be faster than processing in series. The apparatus of FIG. 3 may be used for parallel processing, for example.

The first and second validation results are potentially useful to the system because they provide an indication of whether the receiving apparatus has received the transmitted data and found it to be valid. For example a decision could be made, based on the validation results, whether to retransmit data which has been found invalid by the receiving apparatus. Therefore it would be potentially useful for the receiving apparatus to provide an indicating signal, indicating whether the receiving apparatus has received the transmitted data and found it to be valid.

It would also be useful if an indication could be provided to the transmitting apparatus, of whether the receiving apparatus is capable of handling ciphered and unciphered data. In existing communications systems, the transmitting apparatus has no way of knowing whether the receiving apparatus is capable of handling ciphered and unciphered data. If the indication could be provided to the transmitting apparatus, the transmitting apparatus could then operate to transmit mixed mode data depending to the indication.

In the light of the above, apparatus will now be described for providing firstly an indication of whether the receiving apparatus has received the transmitted data and found it to be valid; and secondly an indication of whether the receiving apparatus is capable of handling data comprising both ciphered and unciphered data.

Figure 5:
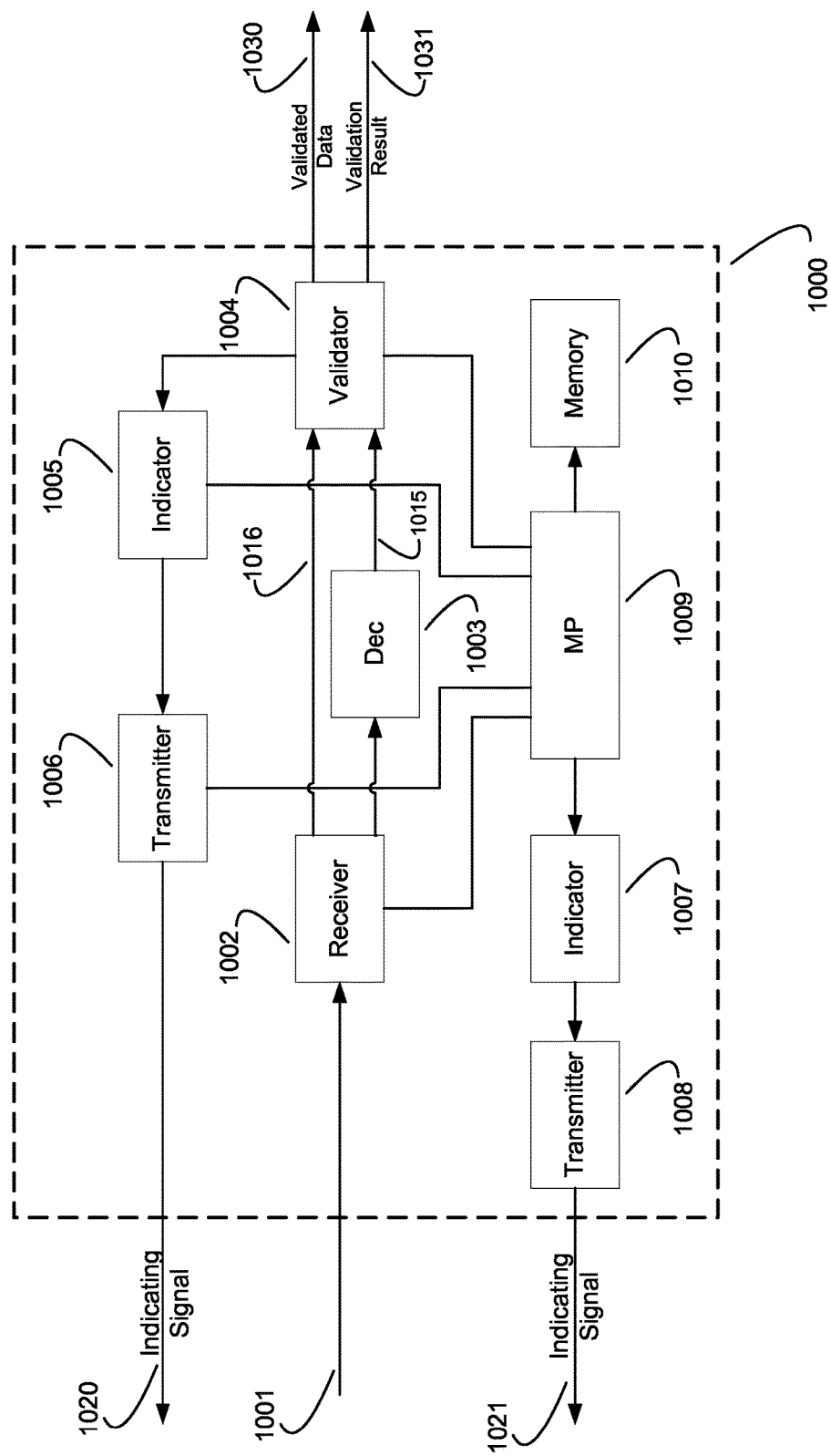
FIG. 5 is a schematic diagram of a receiving apparatus.

FIG. 5 is a schematic diagram of a receiving apparatus 1000. A receiver 1002 receives a signal comprising data 1001 and outputs received data to a decipher 1003 coupled to the receiver. The decipher 1003 is operable to decipher the received data to produce deciphered data, and to output the deciphered data to a validator 1004 coupled to the decipher and to the receiver. The validator 1004 is operable, in a first mode of operation, to validate the deciphered data 1015 to produce a first validation result 1031 and to output the deciphered data 1030 depending upon the first validation result. The validator 1004 is operable, in a second mode of operation, to validate the received data 1016 to produce a second validation result and to output the validated received data 1030 depending upon the second validation result. The validator 1004 is operable, in a third mode of operation, to validate the deciphered data to produce a first validation result and output the deciphered data depending upon the first validation result, and also to validate the received data to produce a second validation result and output the received data depending upon the second validation result. Thus in the third mode, the validator operates in both first and second modes.

A first indicator 1005 is coupled to the validator 1004 and is operable to provide a first indicating signal. The signal comprises an indication of the first and/or second validation result, hence the signal comprises and indication of whether the receiving apparatus has received the transmitted data and found it to be valid. A transmitter 1006 is coupled to the indicator and is operable to transmit the first indicating signal 1020.

The indicating signal 1020 may alternatively or additionally be used by the system to provide an indication of whether the receiving apparatus is capable of handling data comprising both ciphered and unciphered data. For example the transmitting apparatus may transmit a stream of mixed mode test data (comprising both ciphered and unciphered data). The receiving apparatus would then receive the transmitted test data 1001 in receiver 1002 and, depending on the validation of the test data in validator 1004, would transmit the first indicating signal 1020 which may comprise a CRC indication. The transmitting apparatus would then either transmit mixed mode data or transmit all data ciphered, depending upon the first indicating signal 1020.

A second indicator 1007, coupled to a microprocessor 1009, is operable to provide a second indicating signal 1021 comprising an indication of whether the receiving apparatus 1000 is capable of handling data comprising both ciphered and unciphered data. A second transmitter 1008 is coupled to the second indicator and is operable to transmit the second indicating signal 1021.

Microprocessor 1009 is coupled to, and controls the operation of receiver 1002, decipher 1003, validator 1004, first indicator 1005, first transmitter 1006, second indicator 1007, and second transmitter 1008 according to data contained in memory 1010.

The microprocessor 1009 is operable to produce a message and to output the message to the indicator 1007 so that the message may be transmitted by transmitter 1008. The message may be a capability indication message which indicates whether the receiving apparatus 1000 is capable of handling data comprising both ciphered and unciphered data. For example the receiving apparatus may receive a message from the transmitting apparatus 120 of FIG. 1, requesting an indication of whether the receiving apparatus is capable of handling data comprising both ciphered and unciphered data. The receiving apparatus responds by transmitting a second indicating signal, indicating whether the receiving apparatus is capable of handling data comprising both ciphered and unciphered data. The transmitting apparatus either sends mixed mode data or sends all data ciphered, depending on the indication.

Figure 6:
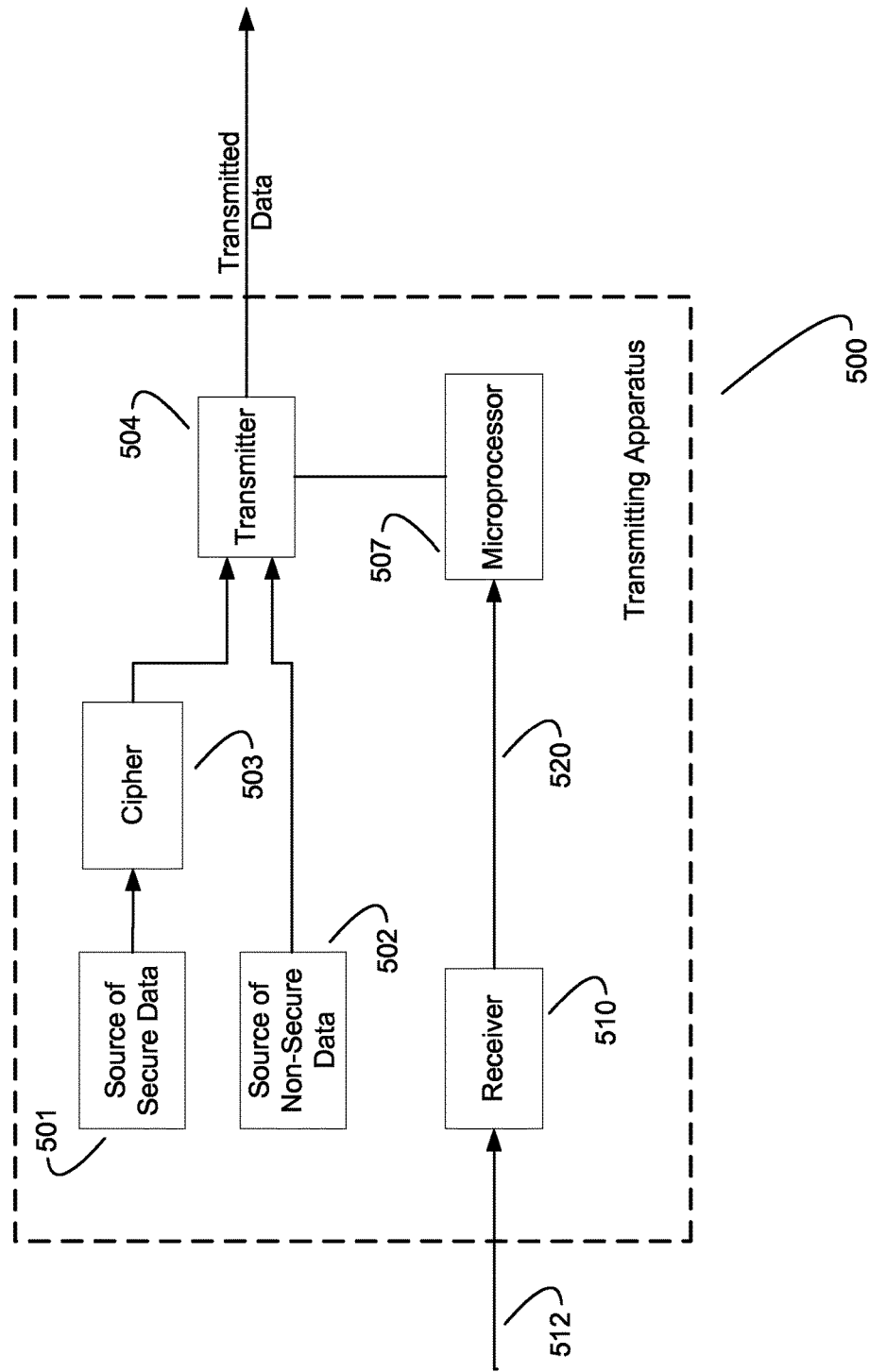
FIG. 6 is a schematic diagram of a first transmitting apparatus.

FIG. 6 is a schematic diagram of a first transmitting apparatus 500 which corresponds to the transmitting apparatus 120 of FIG. 1. The transmitting apparatus 500 includes a source of secure data 501 which outputs secure data to a cipher 503 coupled to the source of secure data 501. The cipher 503 operates to cipher the secure data to produce ciphered secure data, and to output the ciphered secure data to a first transmitter 504, coupled to the cipher 503 and to a source of non-secure data 502. The source of non-secure data 502 outputs non-secure data to the first transmitter 504. The first transmitter 504 transmits both the ciphered secure data and the non-secure data.

The transmitting apparatus 500 also comprises a second receiver 510 for receiving an indicating signal 512 comprising an indication of whether to transmit both ciphered secure data and unciphered non-secure data. The receiver 510 outputs the indication to a microprocessor 507 coupled to the receiver 510 and to the transmitter 504. The indicating signal 512 may be, for example, the indicating signal 1020 shown in FIG. 5, the signal 512 comprising an indication of whether the receiving apparatus is capable of handling mixed mode data. The transmitting apparatus, in this example, is adapted to interpret the indicating signal 512 as comprising an indication of whether to transmit both ciphered secure data and unciphered non-secure data. Microprocessor 507 operates to interpret the received indication 520 and to control the first transmitter 504 according to the indication. The first transmitter 504 is operable to transmit both ciphered secure data and unciphered non-secure data if the indication 512 is to transmit mixed mode data.

The second indicating signal 1021 illustrated in FIG. 5 may comprise a reply message which is generated in response to a request message transmitted by the transmitting apparatus and received by the receiving apparatus. For example the transmitting apparatus may transmit a message requesting an indication of whether the receiving apparatus is capable of handling mixed mode data, and the receiving apparatus would then respond by transmitting the second indicating signal comprising a reply message which indicates whether the receiving apparatus is capable of handling mixed mode data. The following paragraph describes a method which uses signalling that may include both the request message and reply message described above.

Figure 7:
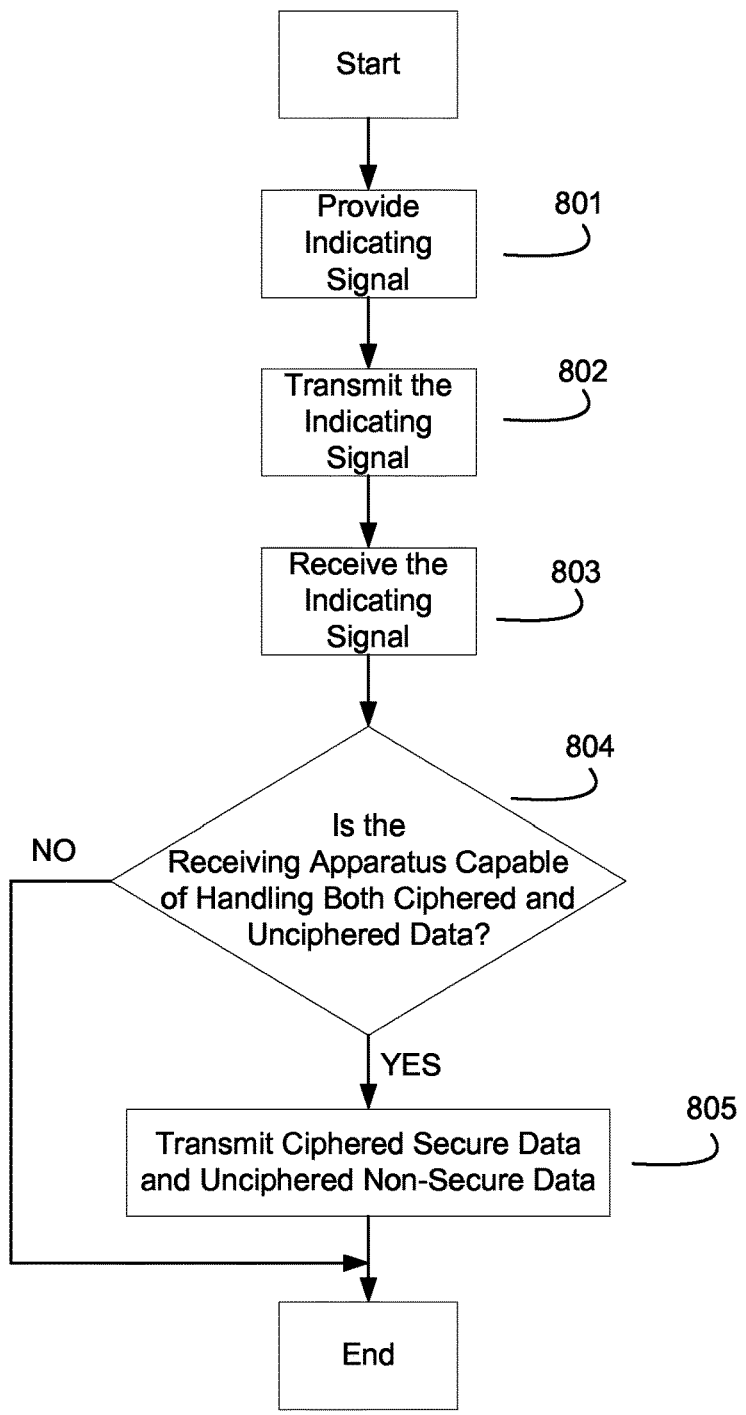
FIG. 7 is a flow diagram illustrating a method of transmitting, or not transmitting, secure and non-secure data.

FIG. 7 is a flow diagram illustrating a method of transmitting, or not transmitting, secure and non-secure data, for example in the apparatus of FIG. 6. In block 801 an indicating signal is provided by a receiving apparatus such as shown in FIG. 5. The indicating signal comprises an indication of whether a receiving apparatus is capable of handling data comprising both ciphered and unciphered data and is transmitted in block 802. In block 803 the transmitted indicating signal is received by the receiver 510 of transmitting apparatus 500 shown in FIG. 6. In block 804 a determination is made of whether the receiving apparatus is capable of handling data comprising both ciphered and unciphered data, based on the indication. If the determination is YES, then the mixed mode data (comprising both the ciphered secure and the unciphered non-secure data) is transmitted in block 805. If the determination is NO, then the mixed mode data is not transmitted. If the determination is NO, then for example the transmitting apparatus is adapted to cipher, and then transmit, all data including non-secure data.

Figure 8:
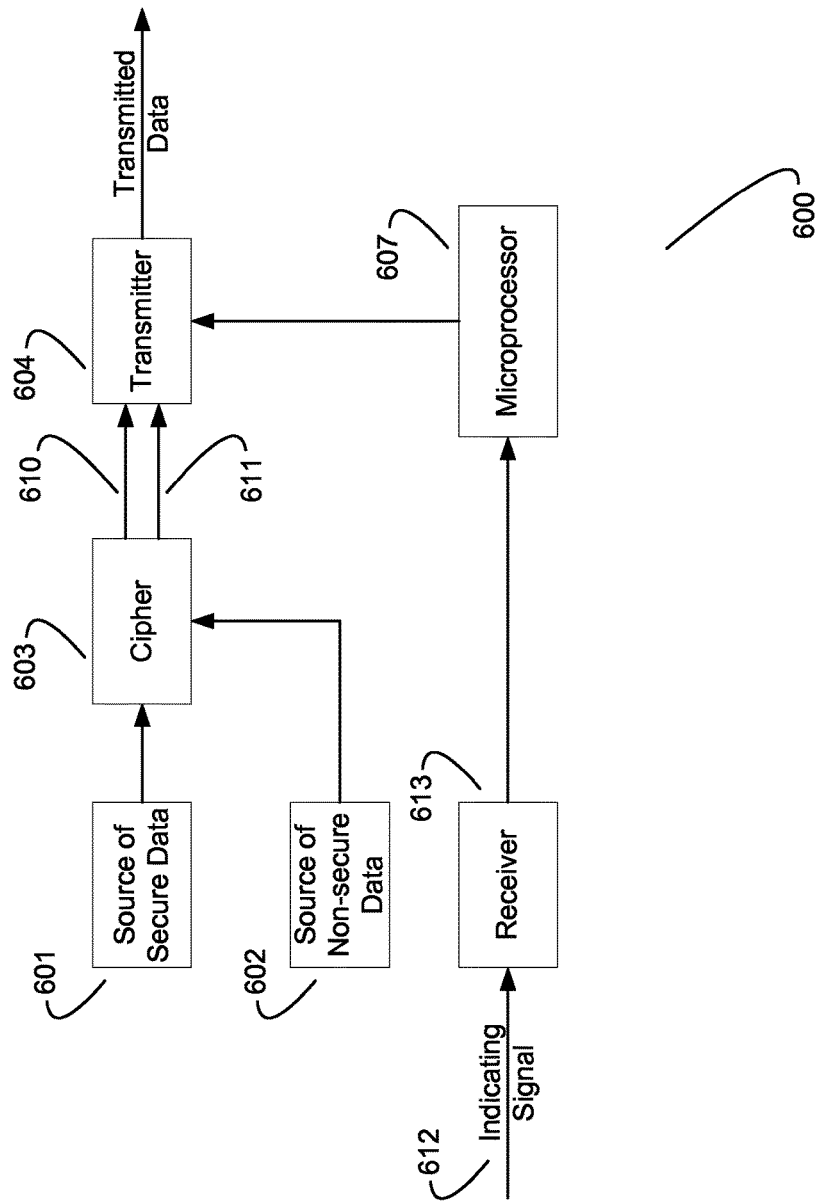
FIG. 8 is a schematic diagram of a second transmitting apparatus which is capable of ciphering both secure and non-secure data.

FIG. 8 is a schematic diagram of a second transmitting apparatus 600 which is capable of ciphering both secure and non-secure data. A source of secure data 601 is operable to output secure data. A source of non-secure data 602 is operable to output non-secure data. A cipher 603, coupled to the source of secure data 601 and to the source of non-secure data, is operable to cipher the secure data to produce ciphered secure data 610 and to cipher the non-secure data to produce ciphered non-secure data 611. A transmitter 604, coupled to the cipher, is operable to transmit both the ciphered secure data and the ciphered non-secure data as transmitted data.

The transmitting apparatus 600 also comprises a second receiver 613 for receiving an indicating signal 612 comprising an indication of whether to transmit both ciphered secure data and unciphered non-secure data. The receiver 613 outputs the indication to a microprocessor 607 coupled to the receiver 613 and to the transmitter 604.

The indicating signal 612 may be, for example, the indicating signal 1020 shown in FIG. 5, the signal 612 comprising an indication of whether the receiving apparatus is capable of handling data comprising both ciphered and unciphered data. The transmitting apparatus 600 is adapted to interpret the indicating signal 1020 as comprising an indication of whether to transmit both ciphered secure data and unciphered non-secure data.

Microprocessor 607 operates to interpret the received indication 620 and to control the transmitter according to the indication. The first transmitter is operable to transmit the ciphered secure and the non-secure data if the indication 612 is to transmit both ciphered secure data and unciphered non-secure data. The transmitter 604 is operable to transmit the ciphered secure data 610 and the ciphered non-secure data 611 if either the indication is not to transmit mixed mode data, or the indication is not received. This has the advantage that a receiving apparatus can receive and use the transmitted data when an indication is not received and when both the secure and the non-secure data are ciphered as in the prior art. The transmitter may also be operable, if the indication is not received, to transmit both the ciphered secure data and the ciphered non-secure data, and transmit both the ciphered secure data and the non-secure data. This has the advantage that either the receiving apparatus shown in FIG. 1, or a receiving apparatus which is capable of handling data comprising both ciphered and unciphered data, or a receiving apparatus which is not so capable, can receive and use the transmitted data if the indication is not received.

Figure 9:
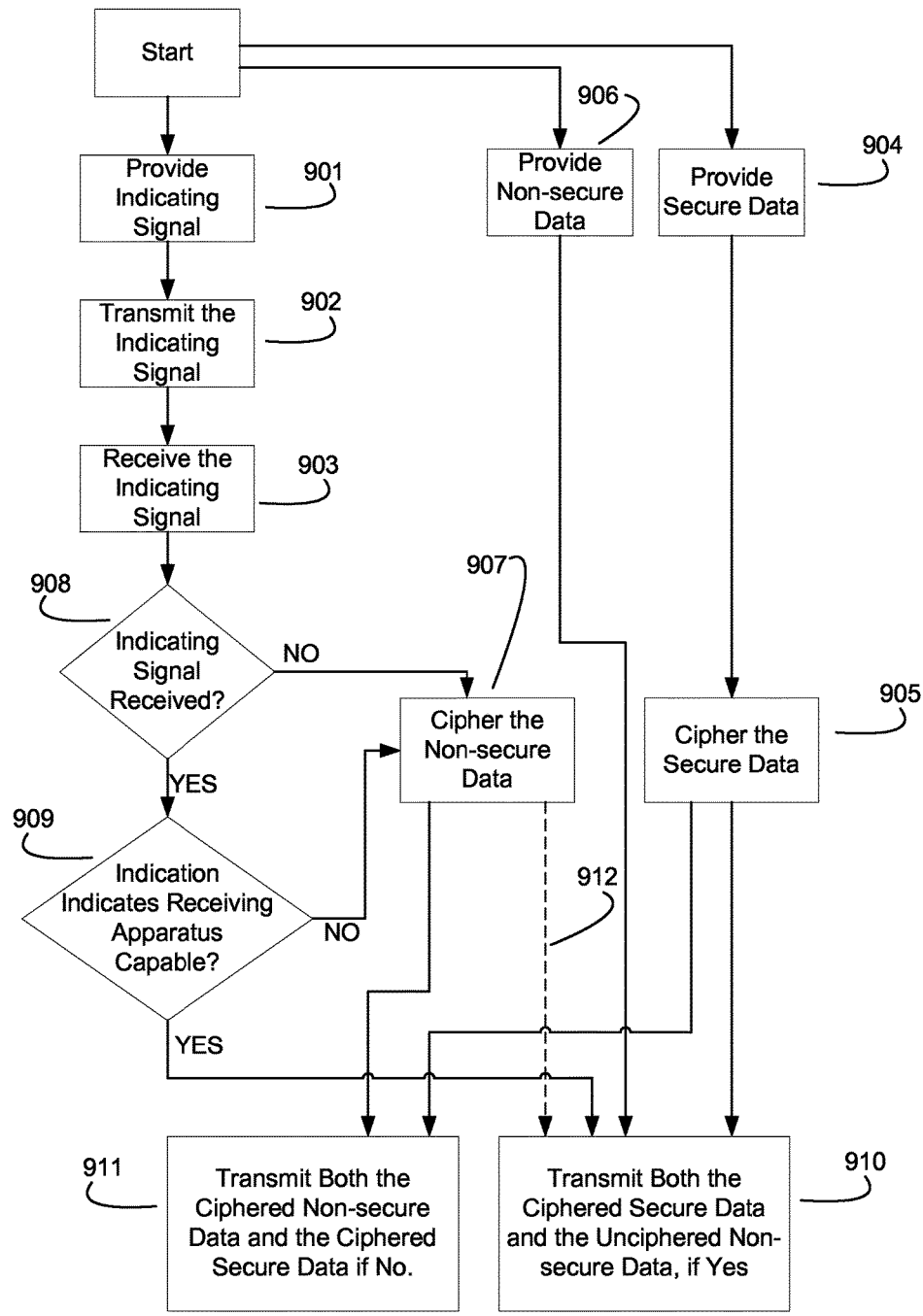
FIG. 9 is a flow diagram illustrating a method of transmitting secure and non-secure data.

FIG. 9 is a flow diagram illustrating another method of transmitting secure and non-secure data. The method of FIG. 9 may be used in the above-described transmitting apparatus 600 shown in FIG. 8. The transmitting apparatus 120 shown in FIG. 1, or the transmitting apparatus 500 shown in FIG. 6 could be adapted to effect the method. In block 904 secure data is provided and in block 905 the secure data is ciphered to produce ciphered secure data. In block 906 non-secure data is provided. In block 901 an indicating signal is provided, the indicating signal providing an indication of whether a receiving apparatus is capable of handling data comprising both ciphered and unciphered data. In block 902 the indicating signal is transmitted. In block 903 the transmitted indicating signal is received. In block 908 a determination is made of whether the indication has been received (YES) or has not been received (NO).

If the determination is YES, a further determination is made in block 909, based on the indicating signal, of whether the receiving apparatus is capable of handling data comprising both ciphered and unciphered data. If the determination is YES, then in block 910 both the ciphered secure data from block 905 and the unciphered non-secure data from block 906 are transmitted.

If the determination in block 909 is NO or if the determination in block 908 is NO, then in block 907 the non-secure data provided in block 906 is ciphered to produce ciphered non-secure data. Both the ciphered non-secure data output from block 907 and the ciphered secure data output from block 905 are then transmitted in block 911. Optionally when the indication is not received (i.e. when the determination of block 908 is NO) the ciphered secure data and the ciphered non-secure data are both transmitted in block 911 and also, as shown by the presence of the dashed line 912, in block 910 both the ciphered secure data and the non-secure data are transmitted.

The foregoing description illustrates systems comprising simple transmitter and receiver arrangements. The ideas disclosed herein may be applied to more complex systems to similar advantage. For example, the ideas may be applied to a cellular communications system. The following description illustrates how the ideas may be applied in a cellular communications system operating according to the GSM/EDGE Radio Access Network (GERAN) standards employed worldwide by the cellular communications industry and maintained by the industry body known as the Third Generation Partnership Project (3GPP).

Figure 10:
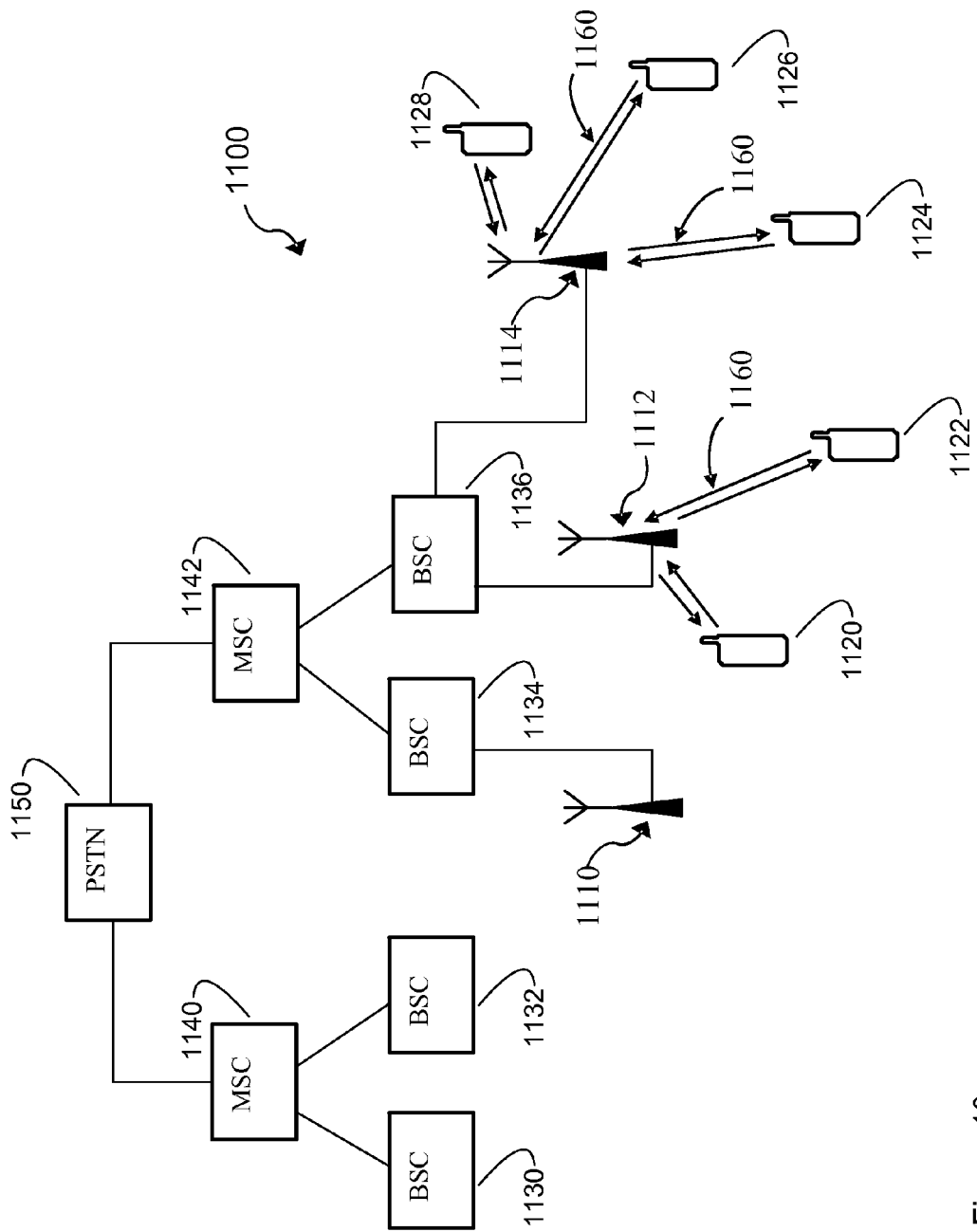
FIG. 10 is a diagram of a cellular communications system.

FIG. 10 is a diagram of a cellular communications system 1100. Base stations 1110, 1112 and 1114 are each capable of communicating with remote stations 1120, 1122, 1124, 1126 and 1128 by means of wireless signals. Base station controllers 1130, 1132, 1134 and 1136 route signals to and from the base stations under the control of mobile switching centres 1140, 1142. The mobile switching centres (MSC's) 1140, 1142 are connected to a public switched telephone network (PSTN) 1150.

Although remote stations are commonly handheld mobile devices (mobile stations, MS), many fixed wireless devices and wireless devices capable of handling data also fall under the general title of remote station. For example, a remote station could be a computer connected to base stations via the internet, or a wireless terminal fixed to a wall of a building or connected to an electricity supply, or even a wireless terminal within a vending machine for providing telemetry services. A wireless device capable of handling data may be for example a wireless device capable of enabling electronic transactions for purchasing goods or services. The communications system could comprise only a single transmitting apparatus and a single receiving apparatus.

Signals 1160 carrying voice and/or data may be transferred between a remote station 1120 and a base station 1112, then routed via the network to another base station 1114, then transferred between a base station 1112 and a remote station 1124, thus allowing remote stations 1120 and 1124 to communicate with each other via the communications system 1100. Alternatively, signals 1160 may be transferred between a remote station 1120 and other communications equipment of another communications system via the public switched telephone network 1150 (PSTN). The PSTN 1150 allows calls to be routed between the mobile cellular system 1100 and another communication system either of the same type as communications system 1100 or of a different type.

In cellular systems, a process known as user authentication is carried out when a new user attempts to access the system. For example, a user of the cellular communications system 1100 above may access the system by operating a remote station 1120. The purpose of authentication is to protect the network against unauthorized use and to prevent the possibility of unauthorized users impersonating authorized users.

During authentication a ciphering key, preferably used for both ciphering and deciphering traffic data, is chosen and is stored both in the network and in the remote station. Once a ciphering key (described above) has been set, communications can take place between the remote station and other parts of the network. Ciphering can be enabled or disabled by the communications network according to confidentiality requirements, or according to the type of data being sent, or according to the existing state of the communications link between a remote station and the network. For example, in digital cellular systems, ciphering is enabled for voice communications but disabled during the process known as handover, whereby a remote station discontinues communication with a first base station and initiates communication with a second base station.

Figure 11:
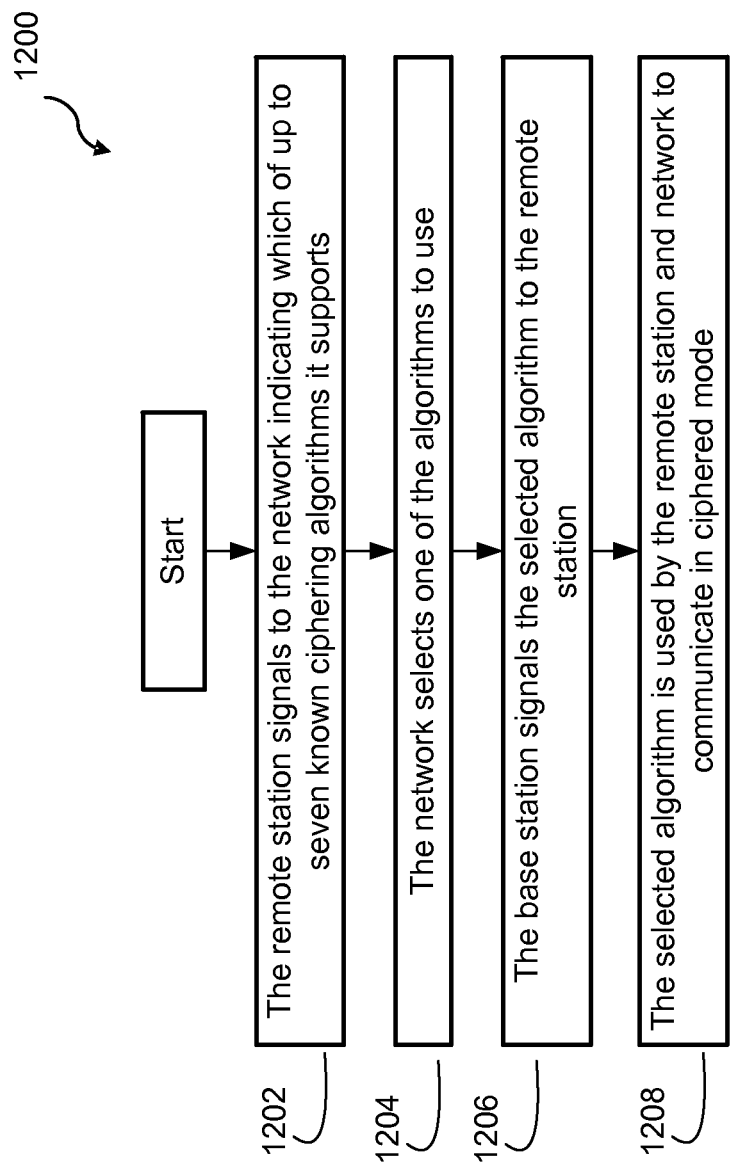
FIG. 11 is a flow diagram illustrating a method for establishing a ciphered communications link.

FIG. 11 is a flow diagram illustrating a method 1200 for establishing a ciphered communications link. This method could be used for a voice call between a remote station and a base station. The base station and the remote station may each support different ciphering algorithms. During signalling between the remote station and the base station the remote station transmits a signal to the base station indicating which ciphering algorithms it supports (block 1202). The network then selects one of these algorithms for use (block 1204). The base station may support more than one algorithm at once, e.g. to communicate with more than one remote station. In block 1206 the base station signals this selected algorithm to the remote station. The selected algorithm is then used by the remote station and base station to communicate in ciphered mode (block 1208).

Figure 12:
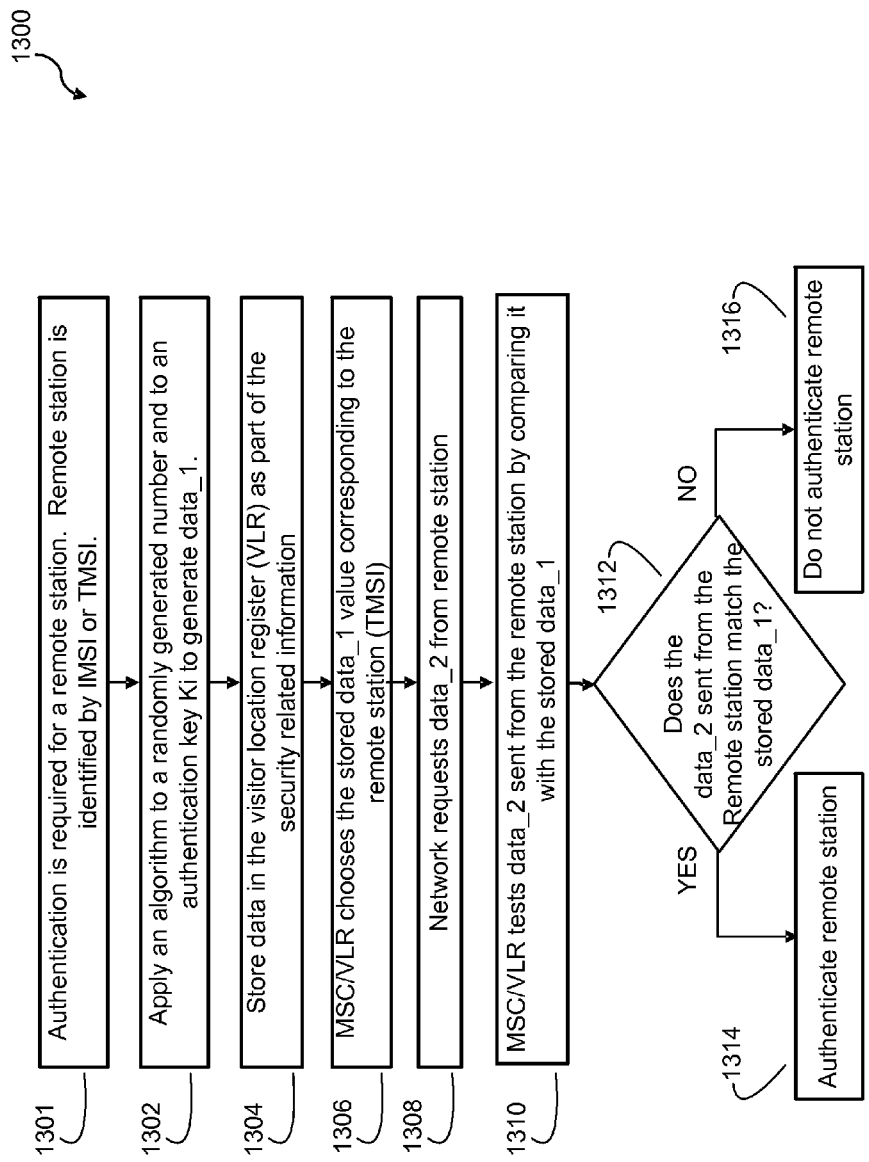
FIG. 12 is a flow diagram illustrating a method for the authentication of a subscriber.

FIG. 12 is a flow diagram illustrating a method for the authentication of a subscriber. Authentication is performed when the subscriber, by means of a remote station, attempts to access the network. The network stores information relating to each user in a register (not shown). A home location register (HLR) is associated with each mobile switching centre (e.g. MSC's 1140, 1142 in FIG. 10) and stores the user's identity and other user information for users belonging to the area served by the MSC. The visitor location register (VLR) stores information for users who are visiting, and are being serviced by, the MSC. When authentication is required for a remote station, the network obtains security-related information from the HLR or VLR corresponding to the remote station.

In block 1301 the remote station is identified by its International Mobile Subscriber Identity (IMSI) or by its Temporary Mobile Subscriber Identity (TMSI) retrieved from either the HLR or the VLR respectively. In block 1302 security information (data_1) is obtained by applying an algorithm to a randomly generated number and to an authentication key Ki. Then the data (data_1) is stored in the VLR as part of the security related information (block 1304).

In block 1306, the MSC/VLR chooses the stored data value (data_1) corresponding to the remote station. In block 1308 the network sends a request to the remote station for the stored second data (data_2, which should be the same as data_1). The MSC/VLR then (in block 1310) tests data_2 sent from the remote station by comparing it with the stored data (data_1). If (block 1312) the data sent from the remote station matches the stored data, the remote station is considered to be authenticated (block 1314). Once the remote station is authenticated, voice and/or data communications can take place between the remote station and the network. Alternatively if (block 1312) the data sent from the remote station does not match the stored data, the remote station is not authenticated (block 1316) and voice and/or data communications cannot take place between the remote station and the network.

Figure 13:
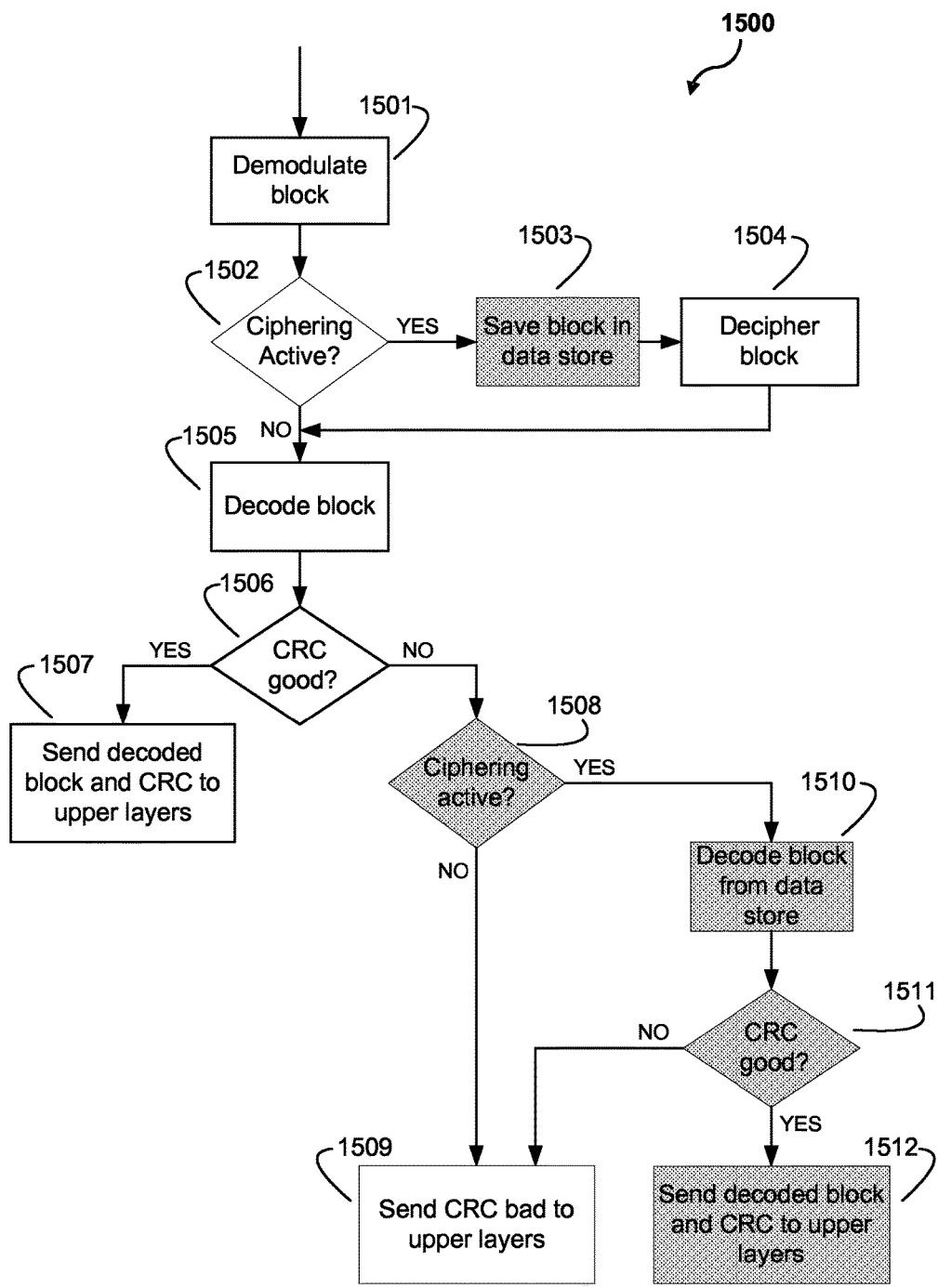
FIG. 13 is a flow diagram illustrating a method for handling received ciphered and unciphered data.

FIG. 13 is a flow diagram illustrating a method 1500 for handling received ciphered and unciphered data. The method 1500 may be carried out in a remote station. A block of coded, modulated data is transmitted by a transmitting apparatus, e.g. the transmitting apparatus 120 of FIG. 1, which may be in a base station (BS). The block of data is received in a receiving apparatus e.g the receiving apparatus 130 of FIG. 1 which may be in a remote station such as a mobile station (MS). The received block of data is demodulated by the receiver of the receiving apparatus (block 1501). The block of data may comprise only secure data, or only non-secure data, but not both.

In block 1502 a determination is made as to whether ciphering is active for the transmitting of the received data. In one example, if the transmitting apparatus transmits a message to the receiving apparatus indicating a selected ciphering algorithm to use, as shown in 1206 of FIG. 11, the receiving apparatus may store this information and be able to determine from the stored information that ciphering is active. In another example, the receiving apparatus may have received a message from the transmitting apparatus instructing the receiving apparatus to transmit and receive ciphered data, i.e. to operate in ciphered mode.

If the determination 1502 is that ciphering is active, the demodulated block of data is stored in a data store (block 1503), which may comprise solid state memory. The stored block of data is deciphered (block 1504) and the deciphered block of data is decoded (block 1505). If the determination 1502 is that ciphering is not active, in block 1505 the block of data is decoded without being deciphered.

A determination is made (block 1506) as to whether the block of data input to the decoder has been successfully decoded. The determination may comprise a cyclic redundancy check (CRC) indicator, but may equally involve any other data verification technique. The determination serves to provide a validation result which indicates whether the decoded data is valid or invalid. The determination serves the same function of providing a validation result as does the validator 107 of FIG. 1.

If the demodulated block of data was ciphered prior to transmission, then provided there is no corruption of the data (e.g. due to a bad link condition), the determination in block 1506 is: YES, the decoded block of data is successfully decoded i.e. is valid. Then (block 1507) both the decoded valid data and an indicating signal, for example a decode indicator which may comprise a block indicator message containing a CRC indicator, are sent to the higher layers of the communications protocol used in the system. The indicating signal or decode indicator indicates, in this example, whether the decoded data is or is not successfully decoded i.e. is or is not valid.

If, on the other hand, the demodulated block of data comprises unciphered data, the determination in block 1506 is NO (the decoded block data is not successfully decoded i.e. not valid), the process moves onto block 1508 in which a determination is made again (as in block 1502 above) as to whether ciphering is active. Since ciphering is indeed active in this example, then the process moves onto block 1510, in which the block of data which is stored in the memory store is decoded. In block 1511, a determination is made as to whether the demodulated and decoded data output from block 1510 is valid, as described above for block 1506. If the determination in block 1511 is YES (the decoded data is valid), then the process moves onto block 1512. In block 1512, the decoded valid data and an indicating signal e.g. a block indicator message are both sent to higher layers of the communications protocol. The process may then repeat from block 1501, whereby further received data is demodulated, and so on.

If the determination in block 1508 is that ciphering is not active, the process moves onto block 1509, in which a block indicator message is sent to higher layers of the communications protocol used in the system. The block indicator message indicates that the received block of data could not be decoded successfully. The process may then repeat from block 1501, such that further received data is demodulated. The same block of data may be retransmitted until it is decoded successfully, or may be retransmitted only once or a set number of times. If the block of data is voice data then the data is generally not retransmitted and the next block of data is received and processed starting with block 1501 of FIG. 13.

A block of data may be transmitted such that the block of data may comprise either ciphered or unciphered data. When data is received which contains both one or more blocks of ciphered data and one or more blocks of unciphered data, the process shown in FIG. 13 and described above ensures that (a) the ciphered blocks of the received data are deciphered then decoded, and (b) the unciphered blocks of the received data are decoded without being deciphered. Therefore each block of data which is input to block 1501 can be successfully decoded, whether the block is ciphered or unciphered, and if the multiple blocks of data comprise ciphered and/or unciphered blocks of data. The process shown in FIG. 13 will therefore work for data comprising wholly ciphered, wholly unciphered, or mixed mode data.

The system can be arranged such that mixed mode data for a remote station is only transmitted by the base station provided that the remote station has indicated to the base station that the remote station is capable of receiving both ciphered and unciphered data when ciphering is active. If the remote station has not given this indication, then the base station will send only ciphered data when ciphering is active. The remote station will for example provide the indication by means of an indicating signal comprising a message.

The following table below shows the determinations made in blocks 1502, 1506, 1508 and 1511 of FIG. 13 for all types of received data (ciphered, unciphered, and mixed mode), for both the case of no errors in the received data and for the case of many errors being present in the received data.

| Data sending mode | Error status | Block 1502 | Block 1506 | Block 1508 | Block 1511 |
|---|---|---|---|---|---|
| All data ciphered | No errors | yes | yes | n/a | n/a |
| All data unciphered | No errors | no | yes | n/a | n/a |
| Data ciphered and unciphered (mixed mode) | No errors | yes | no | yes | yes |
| All data ciphered | Many errors | yes | no | yes | no |
| All data unciphered | Many errors | no | no | no | n/a |
| Data ciphered and unciphered (mixed mode) | Many errors | yes | no | yes | no |

(n/a = not applicable)

Figure 14:
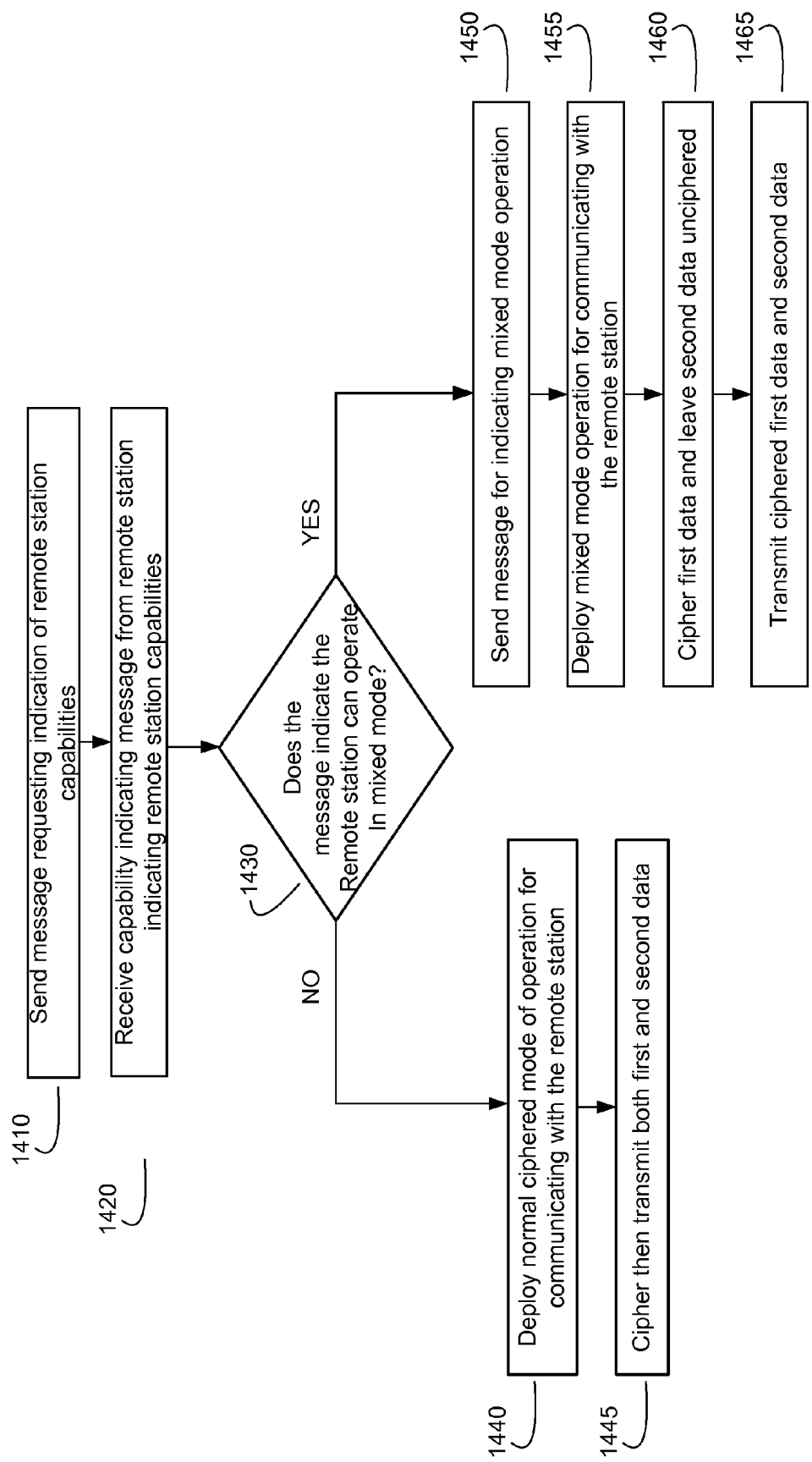
FIG. 14 is a flow diagram illustrating a method for sending ciphered and/or unciphered data that may be carried out in network infrastructure equipment.

FIG. 14 is a flow diagram illustrating a method for sending ciphered and/or unciphered data that may be carried out in network infrastructure equipment. For example the method may be carried out in the base station 1112 of FIG. 10. In block 1410 the network transmits a request message for a remote station, requesting the remote station to send a capability indicating message. The remote station receives the request message and responds by transmitting a capability indicating message (not shown).

In block 1420, the capability indicating message is received by the base station. In block 1430, a determination is made in the base station, depending on the received capability indicating message, as to whether the remote station can operate in mixed mode. If the determination is that the remote station can operate in mixed mode, then in block 1450 the base station sends a mixed mode indicating message for the remote station, indicating that the base station will transmit signals for that remote station in mixed mode. Block 1450 may not be required, since the remote station may not need the mixed mode indicating message in order to operate to handle mixed mode data. The remote station may act according to the process shown in FIG. 13 and described above, which does not require any such mixed mode indicating message from the base station. The remote station, having sent a capability indicating message to the base station (corresponding to block 1420), may automatically operate in mixed mode. In block 1455 mixed mode operation is deployed. In block 1460, secure data is ciphered and non-secure data is unciphered prior to transmission. In block 1470 the ciphered and unciphered data are transmitted.

The procedure shown in FIG. 14 may be largely performed in a mobile switching centre (e.g. MSC 1140, 1142 in FIG. 10). Ciphering information may be requested by the MSC from the receiving apparatus (e.g. remote station via the transmitting apparatus (e.g. base station) and then, once the information is received by the MSC, the MSC instructs the base station to start ciphering. Decision-making function 1430 and ciphering function 1445 and 1450 may be carried out in a base station controller (e.g. BSC 1134, 1136 in FIG. 10) or in a MSC or other network equipment having the required functions.

Figure 15:
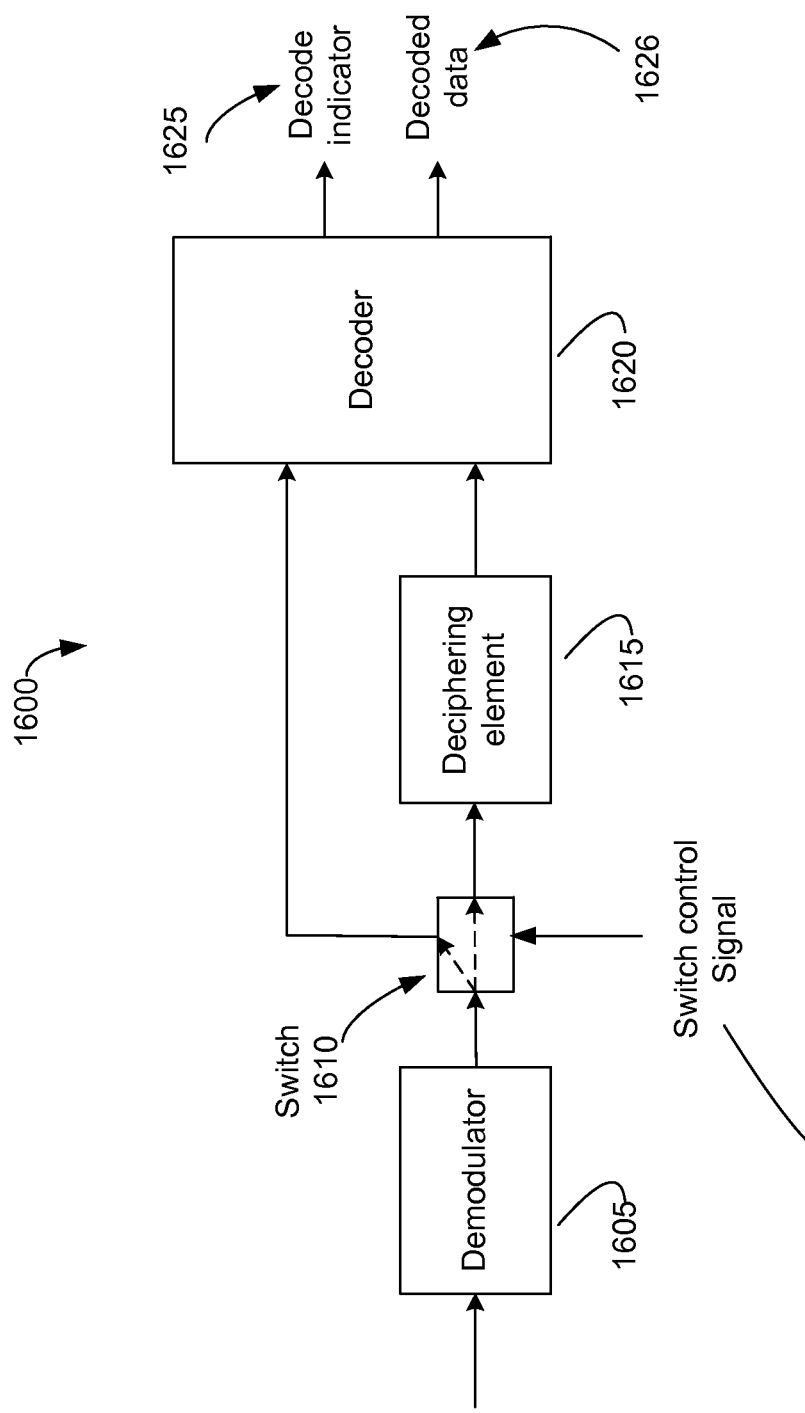
FIG. 15 is a schematic diagram of a portion of a receiver.

FIG. 15 is a schematic diagram of a portion of a receiver. A signal comprising modulated data is input to demodulator 1605 which outputs demodulated data to a first input of a switch 1610 which has as a second input a switch control signal 1612. The switch control signal 1612 is capable of having one of two values: a first value if a decision is made to decipher the demodulated data; and a second value if a decision is made not to decipher the demodulated data but instead to further process the demodulated data without deciphering.

If the decision is made to decipher the demodulated data, the data is output from the switch 1610 to the deciphering element 1615 and deciphered by the deciphering element 1615. The deciphered data is output to a decoder 1620 and decoded by the decoder 1620. The functions shown in FIG. 15 may be implemented in hardware, in software or in digital signal processing circuits i.e. a combination of hardware and software.

If the decision is made not to decipher the demodulated data, the data is output from the switch 1610 and is input to decoder 1620, thus bypassing the deciphering element 1615. Decoder 1620 operates to decode the demodulated data and outputs decoded demodulated data 1626.

In addition, decoder 1620 outputs a decode indicator signal 1625 comprising an indication of whether the demodulated data has or has not been decoded successfully by the decoding element 1620, the indication comprising e.g. a cyclic redundancy check (CRC) indicator. This indication can be used by the system to cause retransmission of a block of data that has not been decoded successfully, as described above.

Another possible function of the decode indicator is to indicate, when ciphering is active in the base station, that the data received by the remote station may be mixed mode data, even though the remote station has no knowledge of the data being mixed-mode data. If a block of unciphered data is input to the deciphering element, the deciphering element will act to decipher the unciphered data but will not succeed and therefore the decode indicator will indicate that the deciphered data is invalid.

The function is based on firstly the remote station treating a first block of data as though it is ciphered data. The function is also based on secondly treating the first block of data as though it is a block of unciphered data if the decode indicator indicates the data has not been decoded successfully. The function is also based on thirdly, treating subsequently-received blocks of data as though they are mixed mode data if the decode indicator indicates the first block of data has been decoded successfully.

The above-described possible function performed by the decode indicator (providing an indication that the data received by the remote station may be mixed mode data) may be provided by an alternative function elsewhere in the system. For example, the network (via the base station) may send an indication to the remote station that it will transmit mixed mode data and, from this indication, the remote station can act to handle mixed mode data. The remote station may for example receive the indication then receive and demodulate the data. The remote station would then, according to the indication, for each block of received demodulated data, first (a) treat the block as ciphered data and second (b) treat the same block as unciphered data. The remote station may equally perform operation (b) before (a) or perform (a) and (b) in parallel.

Figure 16:
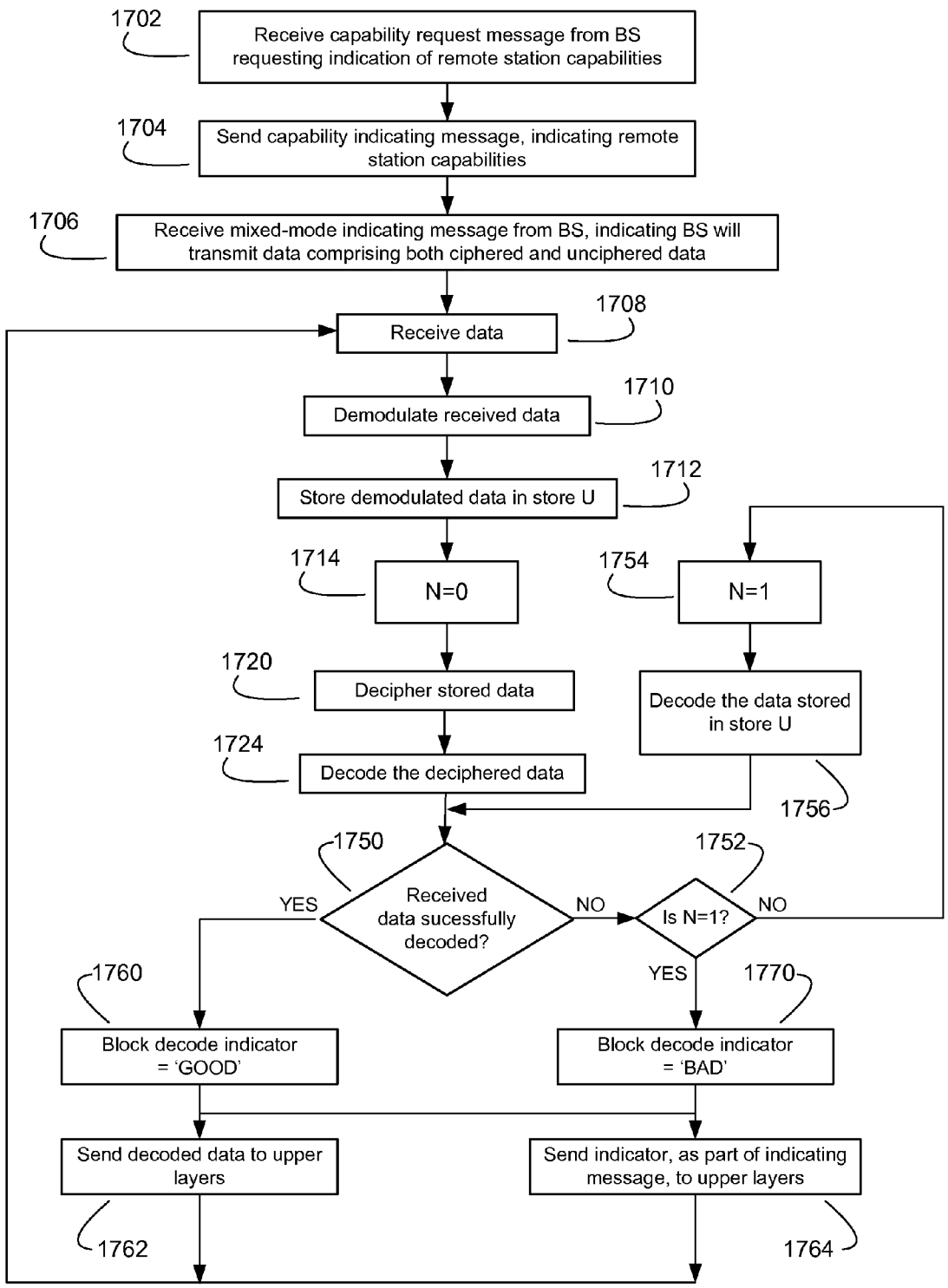
FIG. 16 is a flow diagram illustrating a method wherein secure and non-secure data is transmitted from a base station and received by a remote station.

FIG. 16 is a flow diagram illustrating a method wherein secure and non-secure data is transmitted from a base station and received by a remote station. The base station sends an indication to the remote station that it will transmit mixed mode data, the indication being received by the remote station (1706). The method shown involves decoding of received data both with deciphering and without deciphering.

A capability request message from a base station is received by the remote station in block 1702. In block 1704, the remote station responds by sending a capability indicating message to the base station. The message indicates whether or not the remote station is capable of handling mixed mode data. In block 1706 the remote station receives a mixed mode indicating message from the base station, the message indicating that the base station will transmit mixed mode data. This mixed mode indicating message performs the main function described above in the case of the 'decode indicator' function, and allows the remote station to adapt or set its receiver to correctly handle mixed mode data. The mixed mode indicating message will only indicate that the base station will transmit mixed mode data if the capability indicating message sent by the remote station indicated that the remote station is capable of mixed mode operation. The mixed mode indicating message could for example be part of a ROUTING AREA UPDATE ACCEPT message to the remote station, or may be sent when a valid AUTHENTICATION AND CIPHERING RESPONSE is received from the remote station. The mixed mode indicating message may be part of a modified "START CIPHER" message.

In block 1708, the remote station receives the data transmitted by the base station. The data typically comprises traffic data, for example voice data and it comprises both ciphered and unciphered data provided that the capability indicating message indicated that the remote station is capable of mixed mode operation. In block 1710 the received data is demodulated to produce demodulated data suitable for processing by digital base band circuitry.

In block 1712 the demodulated data is stored in a first data store (data store U), the data store comprising e.g. digital memory, for example random access memory or FLASH memory. In block 1714 a variable parameter N, which can have two values, is set initially to zero. It will be appreciated that the variable parameter N could equally well have been set to zero at some time previous to the action of block 1714. In block 1720 the data stored in store U is deciphered, e.g. by inputting the data to the deciphering element 1615 shown in FIG. 8, to produce deciphered data for decoding. In block 1724 the deciphered data is decoded (e.g. in the decoder element 1620 shown in FIG. 15), to produce decoded, deciphered data.

In block 1750 a determination is made as to whether all the received data has been successfully decoded. The output of block 1750 is a determination (positive or negative) whether all the received data has been successfully decoded to produce valid data. A positive outcome is indicated by 'YES' in the figure.

Block 1760 represents a function that sets the value of a block decode indicator to a particular value, the value being 'good'. The block decode indicator can have only one other value, that other value being 'bad', as set by block 1770. One example of a block decode indicator is a CRC indicator, the principles of operation of which are well known in the art. However, the block decode indicator could be implemented in different ways and in different locations. For example, the remote station could produce an indicator comprising a particular sequence of data for transmission, only if the data for decoding has been successfully decoded.

If the determination in block 1750 is YES, in block 1760 the block decode indicator is set to 'GOOD'. In block 1762 the decoded data is sent to the upper layers of protocol in the communication system, and in block 1764 the indicator is sent to the upper layers of protocol. The process then proceeds back to block 1708 wherein new data is received. If the determination in block 1750 is NO, in block 1752 a further determination is made of whether the parameter N has a value of one (N=1). If the further determination is NO (i.e. if N=0) then, in block 1754, N is assigned a value of 1 (i.e. N=1) and in block 1756 the data which is stored in data store U is decoded by the decoding element. The process then moves to the input of block 1750.

If however the further determination is YES (N=1) then, in block 1770, the block decode indicator is set to 'BAD' and in block 1764 the indicator is sent to the upper layers of protocol. The process then proceeds back to block 1708 wherein data is once again received. Typically, the same block of data, which has been received but not successfully decoded, will be retransmitted by the base station and will then be received by the remote station in block 1708. This would occur for example if the data has been unsuccessfully decoded due to a genuine link failure, for example if the propagation conditions of the transmitted signal were very poor when some of the data was transmitted.

Figure 17:
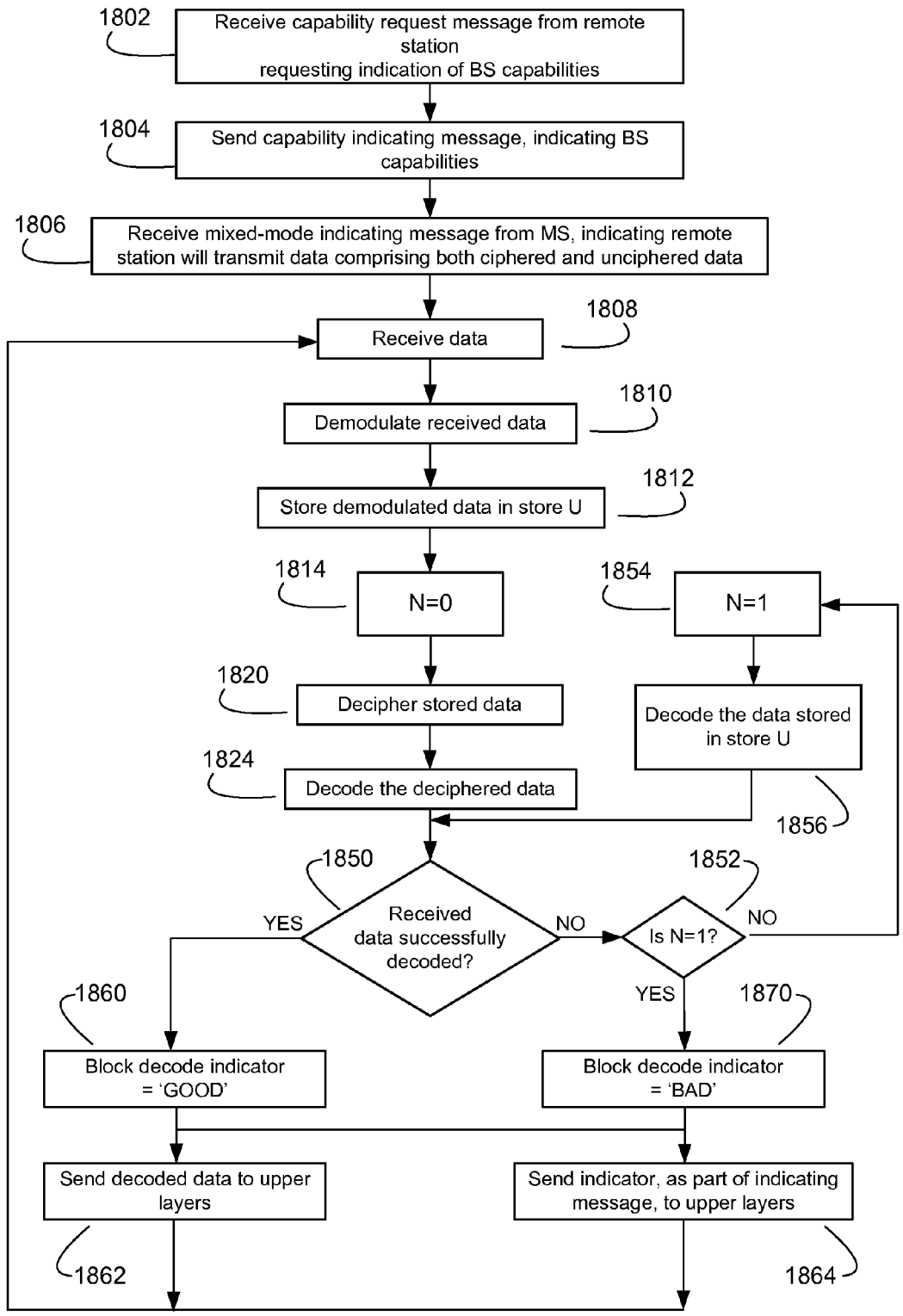
FIG. 17 is a flow diagram illustrating a method wherein secure and non-secure data is transmitted from a remote station and received by a base station.

FIG. 17 is a flow diagram illustrating a method wherein secure and non-secure data is transmitted from a remote station and received by a base station. FIG. 17 shows an example of the method shown in FIG. 16, but applied to uplink instead of downlink data. The steps 1802, 1804 may not be required if it is already known that the base station can receive mixed mode data. The method of FIG. 16 is performed within a remote station. The data comprises one or more blocks of data transmitted by a base station for a remote station (a downlink block of data). Alternatively the method could be performed within a base station for data comprising one or more blocks of data transmitted by a remote station for a base station (an uplink block of data). The data could comprise one or more blocks of data transmitted by a remote station for a base station (an uplink block of data).

For the base station to transmit mixed mode data to the remote station (see FIG. 16), the capability indicating message from the remote station may include indication of the remote station being capable of handle received mixed mode data. Equally, the message (see block 1706 of FIG. 16) sent from the base station to the remote station instructing the remote station to use ciphered mode may include the instruction for the remote station to transmit mixed mode data.

Figure 19:
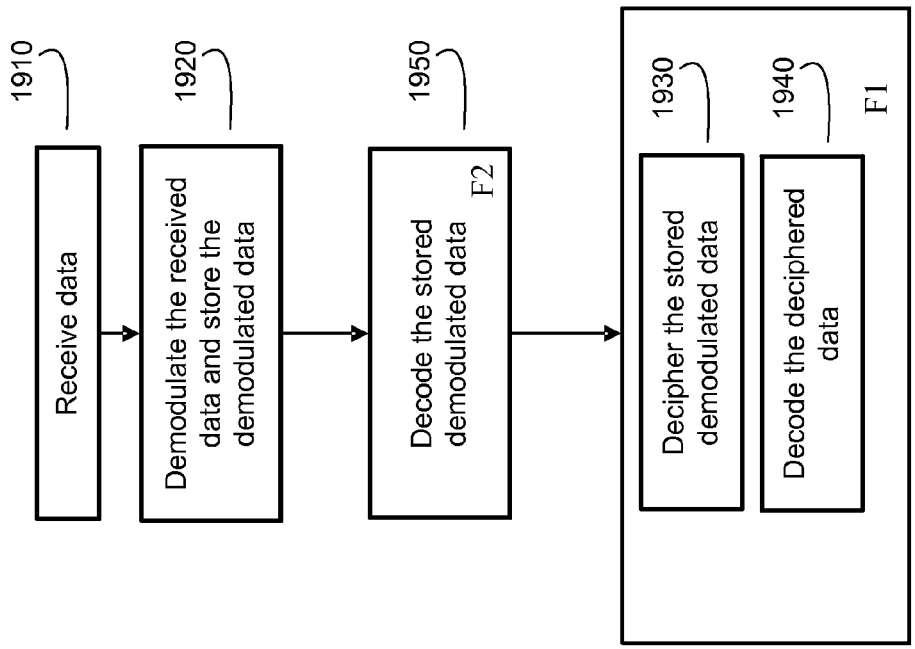
FIG. 19 is a flow diagram illustrating another method of receiving and decoding data.
Figure 18:
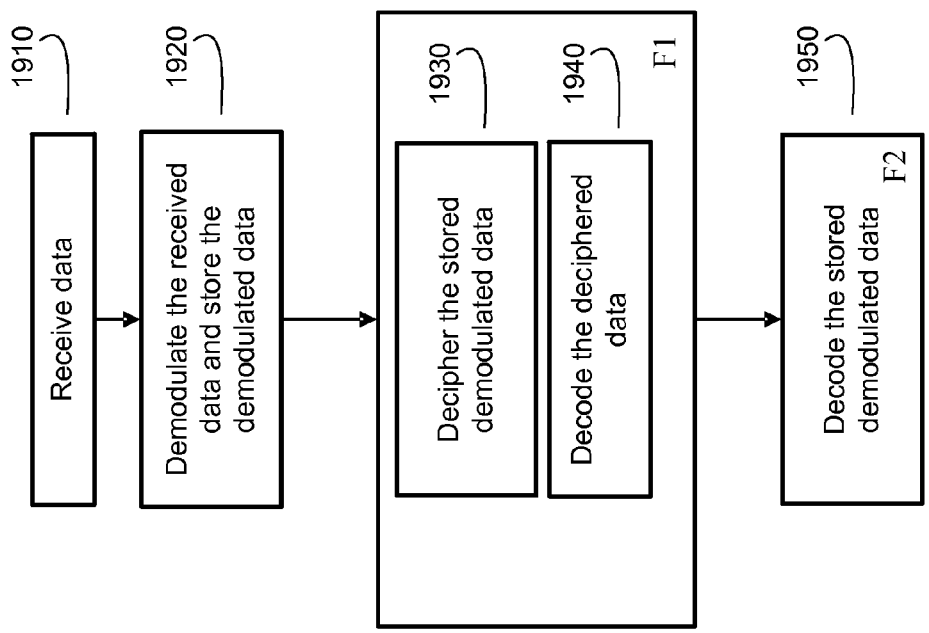
FIG. 18 is a flow diagram illustrating a method of receiving and decoding data.

FIGS. 18 and 19 each represent a method wherein a block of data is received, demodulated and stored, and the demodulated data is acted upon by one or both of two functions.

FIG. 18 is a flow diagram illustrating a method of receiving and decoding data. A first function F1 serves to decipher stored demodulated data (block 1930) and then decode the deciphered data (block 1940). A second function F2 serves to decode the stored demodulated data directly without deciphering the data (block 1950).

FIG. 19 is a flow diagram illustrating another method of receiving and decoding data. In this method the functions shown in FIG. 18 are performed in reverse order. It can be appreciated that if the demodulated data is stored then functions F1 and F2 can be performed in series in either order or in parallel.

Figure 20:
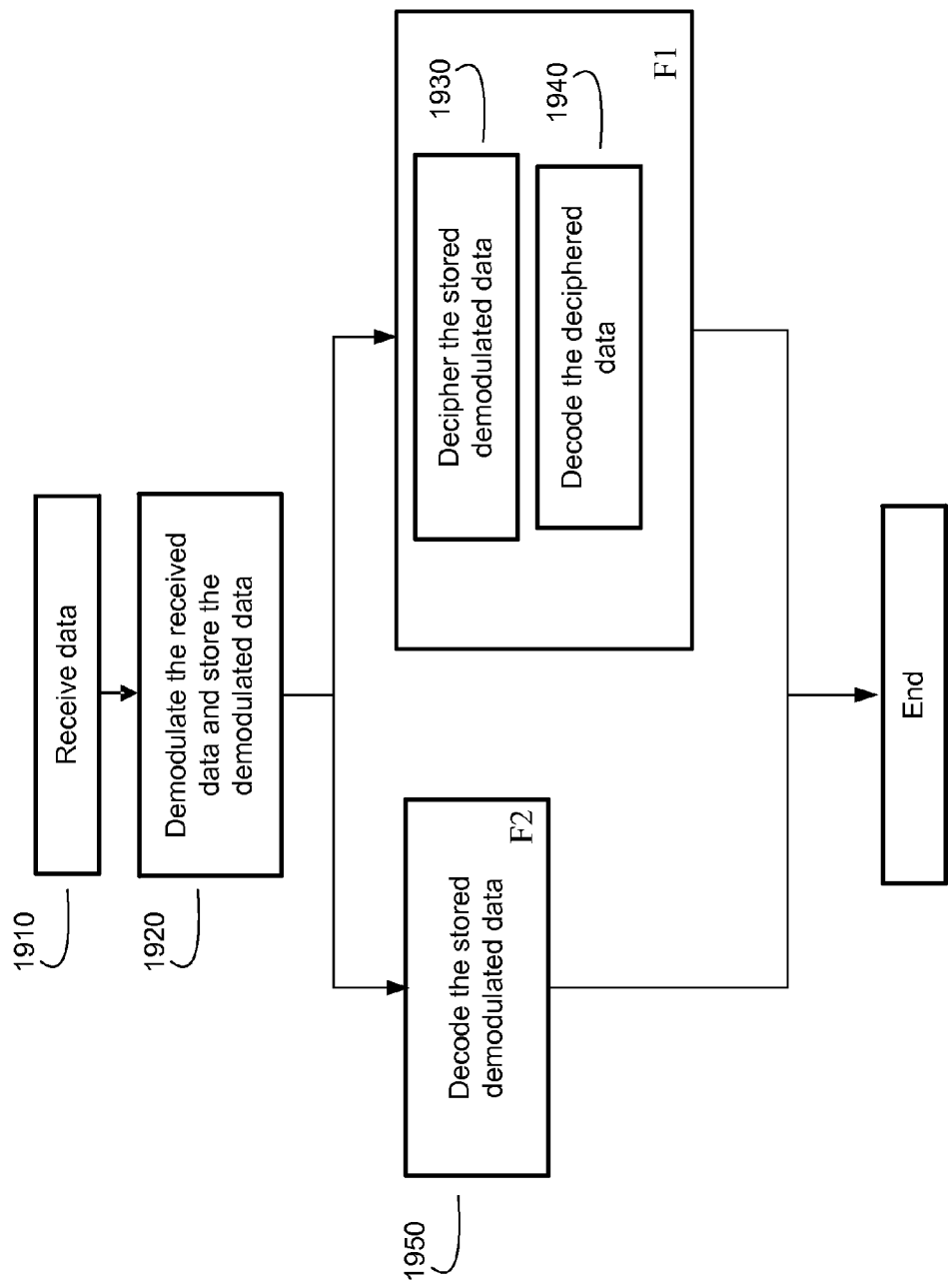
FIG. 20 is a flow diagram illustrating a further method of receiving and decoding data.

FIG. 20 is a flow diagram illustrating a further method of receiving and decoding data. In this method the functions F1 and F2 of FIGS. 18 and 19 are performed in parallel. If mixed mode is used, then performing the two functions F1 and F2 in parallel may have the advantage of providing faster processing than for performing the two functions F1 and F2 in series.

Referring once more to FIG. 18, if all of the resultant decoded data from function F1 is valid, it is not necessary to perform F2. This would only be the case if all the received data was ciphered prior to transmission. However if any of the resultant decoded data from function F1 is not valid, function F2 is performed on the same block of data. The processes shown in FIGS. 18, 19, and 20 may be used for a single block of data or for multiple blocks of data e.g. a frame of data until the data e.g. frame has all been received and decoded with sufficiently few errors.

Referring once again to FIG. 16, each functional block (e.g. 1720) may act on a plurality of blocks or packets of data before the next functional block (e.g. 1724) operates upon the same plurality of blocks. For mixed mode data, valid deciphered data (block 1724) can be combined with valid demodulated data (block 1756) to form combined valid decoded data.

For reference, some examples are given below of sections of the 3GPP standards which, when read in conjunction with the above description, may help to gain an increased understanding of the ideas discussed herein.

An example of the selection or choosing of a key, mentioned above, is described in sections 4.3.2 and 4.3.2b of technical specification entitled "3GPP TS 24.008 V4.17.0 (2007-09) Technical Specification 3rd Generation Partnership Project; Technical Specification Group Core Network and Terminals; Mobile radio interface Layer 3 specification; Core network protocols; Stage 3 (Release 4)". An example of a ciphering method is described in TS 43.020 sections 4.2 to 4.9. (e.g. short message service (SMS) data). An example of a process for establishing a ciphered communications link is described in section 3.5.3 of 3GPP TS 42.009 V4.1.0 (2006-06) Technical Specification 3rd Generation Partnership Project; Technical Specification Group Services and System Aspects; Security aspects (Release 4).

An example of the ciphering method itself is described in TS 43.020 sections 4.2 to 4.9.

The capability indicating message may comprise a message according to 3GPP TS 24.008 Section 10.5.1.7, but the message being modified to include the indication of mixed mode data handling capability, i.e whether the remote station is capable of handling mixed mode data which is partly ciphered and partly unciphered.

The ideas described above may be applied to cellular systems operating to standards other than GERAN standards, which employ ciphering for sending secure data. Having described their operation according to the GERAN standards, the application of the ideas to other standards should be readily apparent to those possessed of the relevant skills. One example of a wireless cellular communications system is the Universal Terrestrial Radio Access (UTRA) system comprising UMTS and GERAN, as standardised by the Third Generation Partnership Project (3GPP). In the interest of brevity, no further examples will be described.

Having thus described the invention by reference to the embodiments shown in the accompanying drawings it is to be well understood that the embodiments in question are by way of example only and that modifications and variations such as will occur to those possessed of appropriate knowledge and skills may be made without departure from the spirit and scope of the invention as set forth in the appended claims and equivalents thereof.

The invention claimed is:

1. A communications system, comprising:
a transmitting hardware apparatus comprising:
    a source of traffic data;
    a source of cellular system control data;
    a cipher coupled to the source of the traffic data for:
        ciphering the traffic data, using a ciphering algorithm selected from a plurality of ciphering algorithms supported by a receiving hardware apparatus, to produce ciphered traffic data;
        selectively ciphering the cellular system control data such that the cellular system control data is ciphered under some circumstances and not ciphered under other circumstances;
    a second receiver for:
        receiving a first indicating signal comprising an indication of whether the receiving hardware apparatus is configured to handle data comprising both ciphered data and unciphered data, and
        receiving a second indicating signal indicating the plurality of ciphering algorithms supported by the receiving hardware apparatus; and
    a first transmitter coupled to the cipher and to the source of the cellular system control data for:
        transmitting the ciphered traffic data and unciphered cellular system control data when the indication is that the receiving hardware apparatus is configured to handle data comprising both ciphered data and unciphered data,
        transmitting the ciphered traffic data and ciphered cellular system control data when the indication is that the receiving hardware apparatus is not configured to handle data comprising both ciphered data and unciphered data, and
        transmitting a third indicating signal indicating a selected ciphering algorithm; and
the receiving hardware apparatus comprising:
    a second transmitter for transmitting the first indicating signal and the second indicating signal;
    a first receiver for receiving the third indicating signal and data transmitted by the first transmitter;
    a decipher coupled to the first receiver for deciphering the received data based on the selected ciphering algorithm to produce deciphered data; and
    a validator, coupled to the decipher and to the first receiver, for:
        validating the received data to produce a second validation result based on an invalid first validation result and outputting the received data depending upon the second validation result; or
        validating the deciphered data to produce a first validation result, outputting the deciphered data depending upon the first validation result, validating the received data to produce a second validation result based on an invalid first validation result, and outputting the received data depending upon the second validation result, and
    wherein the validator is configured to make a determination that input data from at least one of the decipher or the first receiver contains more than a specified percentage of errors and at least one of the first validation result or the second validation result is based on the determination.

2. The communications system of claim 1, wherein there is no confidential, private, or secure information contained in the cellular system control data.

3. The communications system of claim 1, wherein the cellular system control data is selectively ciphered according to an existing state of a communications link between a remote station and a network.

4. The communications system of claim 3, wherein ciphering is enabled for voice communications and disabled during handover.

5. The communications system of claim 1, wherein the cellular system control data comprises a well-defined sequence of digital data.

6. The communications system of claim 1, wherein the cellular system control data is predefined within the communications system.

7. The communications system of claim 1, wherein the cellular system control data is of a known form and occurs at known times.

8. The communications system of claim 1, wherein the cellular system control data comprises a known pattern for data.

9. The communications system of claim 1, wherein the cellular system control data comprises predictable information.

10. A receiving hardware apparatus for receiving both traffic data and cellular system control data, comprising:
a transmitter for transmitting:
    a first indicating signal comprising an indication of whether the receiving hardware apparatus is configured to handle data comprising both ciphered data and unciphered data, and
    a second indicating signal indicating a plurality of ciphering algorithms supported by the receiving hardware apparatus;

a receiver for receiving:
   a third indicating signal indicating a selected ciphering algorithm from a plurality of ciphering algorithms supported by the receiving hardware apparatus, and data, wherein the data comprises:
      ciphered traffic data and unciphered cellular system control data when the indication is that the receiving hardware apparatus is configured to handle data comprising both ciphered and unciphered data, or
      ciphered traffic data and ciphered cellular system control data when the indication is that the receiving hardware apparatus is not configured to handle data comprising both ciphered and unciphered data;
a decipher, coupled to the receiver, for deciphering the received data based on the selected ciphering algorithm to produce deciphered data; and
a validator, coupled to the decipher and to the receiver, for:
   validating the received data to produce a second validation result based on an invalid first validation result and outputting the received data depending upon the second validation result; or
   validating the deciphered data to produce a first validation result, outputting the deciphered data depending upon the first validation result, validating the received data to produce a second validation result based on an invalid first validation result, and outputting the received data depending upon the second validation result, and
   wherein the validator is configured to make a determination that input data from at least one of the decipher or the first receiver contains more than a specified percentage of errors and at least one of the first validation result or the second validation result is based on the determination.

11. The receiving hardware apparatus of claim 10, wherein there is no confidential, private, or secure information contained in the cellular system control data.

12. A method of transmitting and receiving first data and cellular system control data, the method performed by at least one hardware apparatus, the method comprising:
providing the first data;
providing the cellular system control data;
providing a first indicating signal comprising an indication of whether a receiving apparatus is configured to handle data comprising both ciphered and unciphered data;
providing a second indicating signal indicating a plurality of supported ciphering algorithms;
providing a third indicating signal indicating a selected ciphering algorithm from the plurality of supported ciphering algorithms;
transmitting the first indicating signal, the second indicating signal, and the third indicating signal;
receiving the first indicating signal, the second indicating signal, and the third indicating signal;
ciphering traffic data using the selected ciphering algorithm to produce ciphered traffic data;
selectively ciphering the cellular system control data such that the cellular system control data is ciphered under some circumstances and not ciphered under other circumstances;
transmitting both the ciphered traffic data and unciphered cellular system control data when the indication is that the receiving apparatus is configured to handle data comprising both ciphered data and unciphered data;
transmitting the ciphered traffic data and ciphered cellular system control data when the indication is that the receiving apparatus is not configured to handle data comprising both ciphered data and unciphered data;
receiving transmitted data as received data;
deciphering the received data based on the selected ciphering algorithm to produce deciphered data; and
validating the received data to produce a second validation result based on an invalid first validation result and outputting the received data depending upon the second validation result; or
validating the deciphered data to produce a first validation result and outputting the deciphered data depending upon the first validation result, and validating the received data to produce a second validation result based on an invalid first validation result and outputting the received data depending upon the second validation result, and
wherein the validator is configured to make a determination that input data from at least one of the decipher or the first receiver contains more than a specified percentage of errors and at least one of the first validation result or the second validation result is based on the determination.

13. The method of claim 12, wherein there is no confidential, private, or secure information contained in the cellular system control data.

14. A method of receiving both traffic data and cellular system control data, the method performed by at least one hardware apparatus, the method comprising:
transmitting a first indicating signal, the first indicating signal comprising an indication of whether a receiving apparatus is configured to handle data comprising both ciphered data and unciphered data;
transmitting a second indicating signal indicating a plurality of supported ciphering algorithms;
receiving a third indicating signal indicating a selected ciphering algorithm from the plurality of supported ciphering algorithms;
receiving data as received data, wherein the received data comprises:
   ciphered traffic data and unciphered cellular system control data when the indication is that the receiving apparatus is configured to handle data comprising both ciphered data and unciphered data, or
   ciphered traffic data and ciphered cellular system control data when the indication is that the receiving apparatus is not configured to handle data comprising both ciphered data and unciphered data;
deciphering the received data based on the selected ciphering algorithm to produce deciphered data; and
validating the received data to produce a second validation result based on an invalid first validation result and outputting the received data depending upon the second validation result; or
validating the deciphered data to produce a first validation result and outputting the deciphered data depending upon the first validation result, and validating the received data to produce a second validation result based on an invalid first validation result and outputting the received data depending upon the second validation result, and
wherein the validator is configured to make a determination that input data from at least one of the decipher or the first receiver contains more than a specified percentage of errors and at least one of the first validation result or the second validation result is based on the determination.

15. The method of claim 14, wherein there is no confidential, private, or secure information contained in the cellular system control data.

16. A computer program product, comprising:
a non-transitory computer-readable medium, comprising:
code for causing a computer to transmit a first indicating signal, the first indicating signal comprising an indication of whether a receiving apparatus is configured to handle data comprising both ciphered data and unciphered data;
code for causing the computer to transmit a second indicating signal indicating a plurality of supported ciphering algorithms;
code for causing the computer to receive a third indicating signal indicating a selected ciphering algorithm from the plurality of supported ciphering algorithms;
code for causing the computer to receive data as received data, wherein the received data comprises:
ciphered traffic data and unciphered cellular system control data when the indication is that the receiving apparatus is configured to handle data comprising both ciphered data and unciphered data, or
ciphered traffic data and ciphered cellular system control data when the indication is that the receiving apparatus is not configured to handle data comprising both ciphered data and unciphered data;
code for causing the computer to decipher the received data based on the selected ciphering algorithm to produce deciphered data; and
code for causing the computer to:
validate the received data to produce a second validation result based on an invalid first validation result and output the received data depending upon the second validation result; or
validate the deciphered data to produce a first validation result and output the deciphered data depending upon the first validation result, and validate the received data to produce a second validation result based on an invalid first validation result and output the received data depending upon the second validation result, and
wherein the code causes the computer to make a determination that input data from at least one of the decipher or the first receiver contains more than a specified percentage of errors and at least one of the first validation result or the second validation result is based on the determination.

17. The computer program product of claim 16, wherein there is no confidential, private, or secure information contained in the cellular system control data.

* * * * *